(12) United States Patent
Bi et al.

(10) Patent No.: US 11,943,510 B2
(45) Date of Patent: Mar. 26, 2024

(54) MULTIMEDIA PLAYBACK METHOD, APPARATUS, TERMINAL, AND STORAGE MEDIUM

(71) Applicant: TENCENT TECHNOLOGY (SHENZHEN) COMPANY LTD, Guangdong (CN)

(72) Inventors: Siyuan Bi, Shenzhen (CN); Ning Jiang, Shenzhen (CN); Lu Zhang, Shenzhen (CN); Yiyang Li, Shenzhen (CN); Shaoan Zhen, Shenzhen (CN); Daren Li, Shenzhen (CN); Linhan Cao, Shenzhen (CN); Tingting Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 19 days.

(21) Appl. No.: 17/982,125

(22) Filed: Nov. 7, 2022

(65) Prior Publication Data

US 2023/0073045 A1    Mar. 9, 2023

Related U.S. Application Data

(63) Continuation-in-part of application No. PCT/CN2022/082669, filed on Mar. 24, 2022.

(30) Foreign Application Priority Data

Mar. 31, 2021   (CN) .......................... 202110354687.9

(51) Int. Cl.
   *H04N 21/472*   (2011.01)
   *H04N 21/845*   (2011.01)

(52) U.S. Cl.
   CPC ... *H04N 21/47217* (2013.01); *H04N 21/8456* (2013.01)

(58) Field of Classification Search
   CPC ......... H04N 21/47217; H04N 21/8456; H04N 21/4668; H04N 21/4383; H04N 21/47202; H04N 21/433; G06F 16/435
   See application file for complete search history.

(56) References Cited

U.S. PATENT DOCUMENTS

2016/0014482 A1   1/2016  Chen et al.

FOREIGN PATENT DOCUMENTS

| CN | 105191331 A | 12/2015 |
|----|-------------|---------|
| CN | 106507143 A | 3/2017  |

(Continued)

OTHER PUBLICATIONS

International Search Report for PCT/CN2022/082669 dated Jun. 16, 2022 [PCT/ISA/210].

(Continued)

*Primary Examiner* — Anthony Bantamoi
(74) *Attorney, Agent, or Firm* — Sughrue Mion, PLLC

(57) ABSTRACT

A multimedia playback method includes: playing first multimedia data, switching from playing the first multimedia data to playing a multimedia frame corresponding to a target starting point of second multimedia data, based on a media switching operation, the second multimedia data including multimedia frames corresponding to a plurality of time points, the plurality of time points including pre-configured P candidate starting points, and the target starting point belonging to the P candidate starting points, and switching, during the playing of the second multimedia data, from playing a first multimedia frame in the second multimedia data to playing a new multimedia frame corresponding to a new starting point, based on a target triggering operation, the (Continued)

first multimedia frame being a multimedia frame played at a moment at which the target triggering operation is performed, and the new starting point being a candidate starting point other than the target starting point. .

18 Claims, 19 Drawing Sheets

(56) References Cited

FOREIGN PATENT DOCUMENTS

| | | |
|---|---|---|
| CN | 107333182 A | 11/2017 |
| CN | 110475154 A | 11/2019 |
| CN | 111010619 A | 4/2020 |
| CN | 111669655 A | 9/2020 |
| WO | 2020/231528 A1 | 11/2020 |

OTHER PUBLICATIONS

Written Opinion for PCT/CN2022/082669 dated Jun. 16, 2022 [PCT/ISA/237].

MULTIMEDIA PLAYBACK METHOD, APPARATUS, TERMINAL, AND STORAGE MEDIUM

CROSS-REFERENCE TO RELATED APPLICATIONS

This application is a continuation application of International Application No. PCT/CN2022/082669, filed on Mar. 24, 2022, which claims priority to Chinese Patent Application No. 202110354687.9, filed with the China National Intellectual Property Administration on Mar. 31, 2021, the disclosures of each of which being incorporated by reference herein in their entireties.

FIELD

The disclosure relates to the field of Internet technologies, particularly to the field of computer technologies, and more particularly to multimedia playback.

BACKGROUND

Multimedia refers to the combination of multiple types of media, generally including one or more media forms such as texts, audio, and images. Data generated based on multimedia may be referred to as multimedia data, which may include video data (e.g., film and television drama videos, movie videos, etc.), audio data (e.g., popular music, opera, etc.), and the like. At present, how to play multimedia data better has become a research hot spot.

SUMMARY

According to various embodiments, a multimedia playback method may include: playing first multimedia data; switching from playing the first multimedia data to playing a multimedia frame corresponding to a target starting point of second multimedia data, based on a media switching operation, the second multimedia data including multimedia frames corresponding to a plurality of time points, the plurality of time points including pre-configured P candidate starting points, the target starting point belonging to the pre-configured P candidate starting points, and P being a positive integer greater than 1; and switching, during the playing of the second multimedia data, from playing a first multimedia frame in the second multimedia data to playing a new multimedia frame corresponding to a new starting point, based on a target triggering operation, the first multimedia frame being a multimedia frame played at a moment at which the target triggering operation is performed, and the new starting point being a candidate starting point other than the target starting point among the pre-configured P candidate starting points.

According to various embodiments, a multimedia playback method, executed by a computer device, may include: playing first multimedia data; switching, based on a target starting point of second multimedia data, from playing the first multimedia data to playing a multimedia frame corresponding to a target starting point of second multimedia data, based on a media switching operation, the target starting point being determined according to at least one of following information: a user preference profile of a target user and hot spot information of the second multimedia data.

According to various embodiments, a multimedia playback apparatus, a terminal, and a non-transitory computer storage medium consistent with the foregoing methods may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1A:
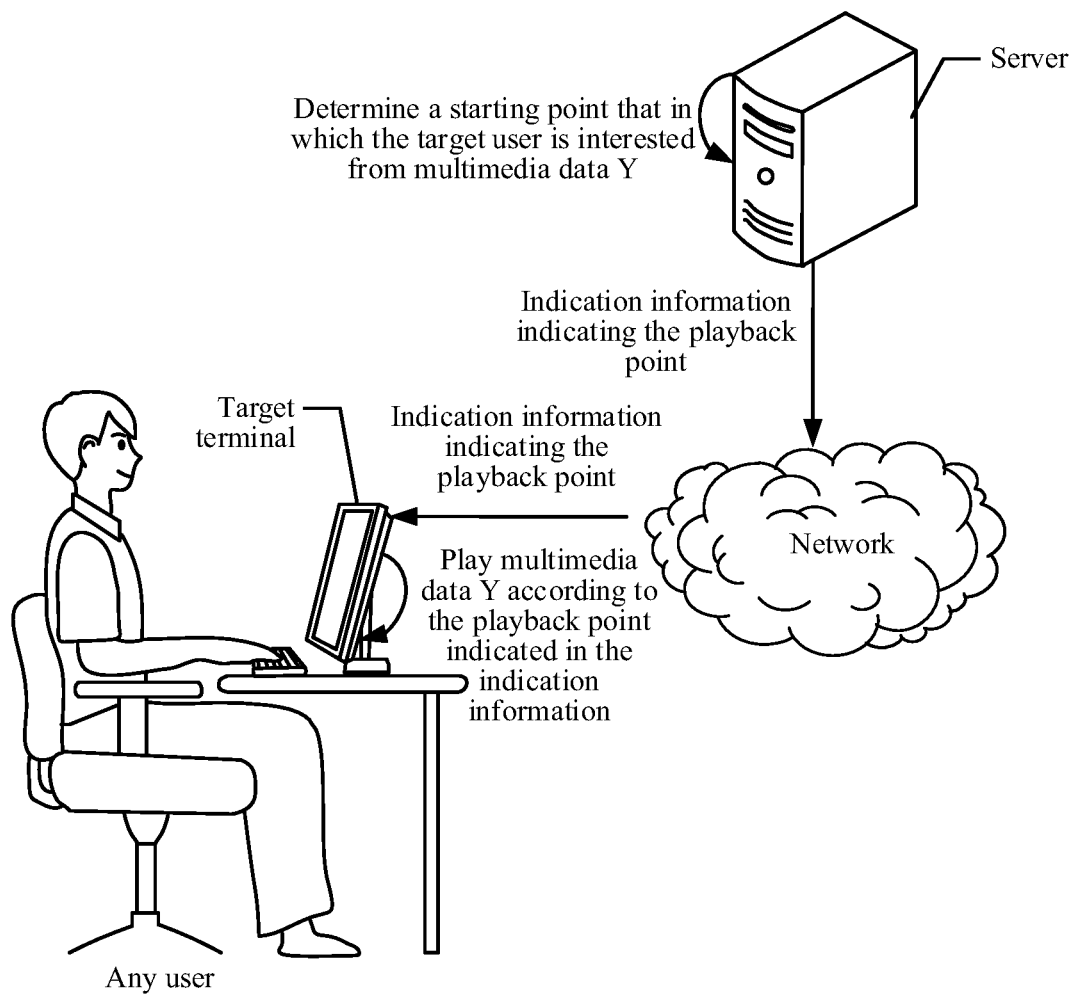
FIG. 1A is a schematic diagram showing interaction between a terminal and a server according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all embodiments. However, it may be understood that the "some embodiments" may be the same subset or different subsets of all the embodiments, and may be combined with each other without conflict.

In some embodiments, P candidate starting points may be flexibly pre-configured for second multimedia data according to actual requirements, so that in response to a media switching operation during playing of first multimedia data, a target starting point may be flexibly selected from the P candidate starting points, and switching from playing the first multimedia data to playing a multimedia frame corresponding to the target starting point in the second multimedia data is performed based on the target starting point in the second multimedia data, so that the flexibility of multimedia playback can be effectively improved. In addition, in response to a target triggering operation during playing of the second multimedia data, switching from a first multimedia frame to another multimedia frame that meets the actual requirements (that is, a multimedia frame corresponding to a new starting point) may be automatically performed by positioning and switching the playback point, thereby reducing the playback of useless multimedia frames (multimedia frames that do not meet the actual requirements). This not only can further improve the flexibility of multimedia playback, but also can effectively save processing resources and effectively improve the playback effectiveness and playback efficiency of the second multimedia data.

In some embodiments, based on the media switching operation during playing of the first multimedia data, switching from playing the first multimedia data to playing the multimedia frame corresponding to the target starting point in the second multimedia data may be performed based on the target starting point of the second multimedia data. Since the target starting point is determined according to at least one of the user preference profile of the target user and the hot spot information of the second multimedia data, the multimedia frame corresponding to the target starting point can satisfy interest preferences of the target user or arouse the interest of the target user to a greater extent. Therefore, playing the second multimedia data starting from the target starting point can greatly improve the attraction of the second multimedia data to the target user, making the target user more willing to continue playing the second multimedia data, thereby improving the user stickiness of the second multimedia data and the playback conversion rate of the second multimedia data. Since the whole process does not require the target user to manually find and play multimedia frames that can arouse the interest of the target user by repeatedly dragging the progress bar, not only the convenience and the playback efficiency of multimedia data can be effectively improved, but also the playback of useless multimedia frames that are not of interest to the target user can be reduced, thereby saving processing resources and effectively improving the playback effectiveness of the second multimedia data.

In some embodiments, multimedia data refers to a data sequence formed by the sequential arrangement of multimedia frames corresponding to a plurality of time points. The multimedia frames may be audio frames or video frames, which is not limited herein. That is to say, the multimedia data mentioned in some embodiments may be music or video, which is not limited herein. The so-called music may be understood as an audio sequence composed of a plurality of audio frames arranged in sequence, and may be divided into pop music, classical music, opera music, and so on. The so-called video may be understood as an image sequence composed of a plurality of image frames arranged in sequence, and can be divided into film and television videos, variety show videos, we-media videos, game videos, etc. The film and television video refers to: a video produced by recording a performance process of a human and/or animal and a surrounding environment according to a pre-made script in a specified photographing scene, followed by addition of audio and special effects, and so on. The variety video refers to: an entertaining video that combines multiple art forms. The we-media video refers to: a video produced by an ordinary person by photographing a scene using a camera device and published through a network or other channels, e.g., video blog (vlog). The game video refers to: a video produced by recording a game screen displayed on a terminal screen of any player user or a game screen displayed on a terminal screen of a user watching a game process of the player user in a process where one or more player users play a game. Any video has a preset playback duration. When the preset playback duration of a video is less than a duration threshold, the video may be called a short video. When the preset playback duration of a video is greater than the duration threshold, the video may be called a long video.

To better implement multimedia playback, some embodiments provide a multimedia playback solution. The general principle of the multimedia playback solution is as follows: In a process of playing certain multimedia data (e.g., multimedia data X) for a target user, when a media switching operation is detected, another multimedia data (e.g., multimedia data Y) may be switched to, and according to one or more of a user preference profile of the target user and hot spot information of the multimedia data Y, a starting playback point of the multimedia data Y may be adjusted to a playback point that the target user is interested in, so as to play the multimedia data Y. This can greatly improve the attraction of the multimedia data Y to the target user, making the target user more willing to continue playing the multimedia data Y, thereby improving the user stickiness and the playback conversion rate of the multimedia data Y. The playback conversion rate is a ratio of the number of valid playbacks to the total number of playbacks. When a piece of multimedia data is played for a duration longer than a set threshold, it may be considered that the multimedia data has been validly played. When a target triggering operation is detected during playing of the multimedia data Y, switching from playing a multimedia frame played at a moment at which the target triggering operation is detected to playing a multimedia frame that the target user is interested in and that corresponds to another playback point in the multimedia data Y. This can further improve the attraction of the multimedia data Y to the target user, and further improve the user stickiness of the multimedia data Y. Since such a multimedia playback method does not require the target user to manually find and play multimedia frames that can arouse the interest of the target user, not only the playback efficiency of multimedia data can be effectively improved, but also the playback of useless multimedia frames that are not of interest to the target user can be reduced, thereby saving processing resources and effectively improving the playback effectiveness of the second multimedia data.

The user preference profile of the target user is data used to describe a preference (interest) of the target user. The hot spot information of the multimedia data Y may be used to indicate a multimedia frame with a large popularity value in the multimedia data Y. The popularity value is used to reflect the popularity of the multimedia frame. Generally, a larger popularity value indicates that more people have played the multimedia frame, and indicates a higher popularity of the multimedia frame, i.e., a higher probability that the multimedia frame can arouse the interest of a user. The multimedia data Y may be multimedia data specified by the target user as needed, or multimedia data selected from a database according to the user preference profile of the target user, or other multimedia data belonging to the same data set as the multimedia data X, which is not limited herein. For example, if the target user selects multimedia data 1 during playing of the multimedia data X, the multimedia data 1 may be determined as the multimedia data Y. For another example, it is predicted that the target user may be interested in multimedia data 2 according to the user preference profile of the target user, the multimedia data 2 may be determined as the multimedia data Y. For another example, the data set to which the multimedia data X belongs also includes multimedia data 3, multimedia data 4, etc., the multimedia data 3 or the multimedia data 4 may be determined as the multimedia data Y.

In an implementation, the multimedia playback solution may be executed by a computer device. For example, the computer device may be a target terminal. The target terminal mentioned herein may include but is not limited to: a smartphone, a tablet computer, a notebook computer, a desktop computer, a smart television, or the like. Various applications (APPs), such as video playback applications, music playback applications, social networking applications, browser applications, information flow applications, and educational applications, may be run in the target terminal. In another implementation, for example, the computer device may include a target terminal and a server, i.e., the multimedia playback solution may also be jointly executed by the target terminal and the server. In this case, the target terminal and the server may be connected through a network. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, an artificial intelligence platform, etc., which is not limited herein.

Figure 1B:
FIG. 1B is a schematic diagram of switching playing of multimedia data according to some embodiments.

When the multimedia playback solution is jointly executed by the target terminal and the server, the target terminal may be responsible for executing operations of playing the multimedia data X and the multimedia data Y, and the server may be responsible for executing an operation of determining a playback point in which the target user is interested in the multimedia data Y based on one or more of the user preference profile of the target user and the hot spot information of the multimedia data Y, and executing an operation of delivering indication information indicating the determined playback point to the target terminal, so that the target terminal may play the multimedia data Y according to the playback point indicated in the indication information, as shown in FIG. 1A. For example, the multimedia data X is a video X and the multimedia data Y is a video Y. If the server determines according to the user preference profile that the target user is interested in an image frame at the 5th second in the video Y and an image frame at the 58th second in the video Y, the server may determine that starting points 11 that the target user is interested in are the 5th second and the 58th second. Therefore, the server may generate indication information "Video Y-5th second" and indication information "Video Y-58th second", and send the indication information to the target terminal, so that when the target terminal is playing an image frame 12 at the 1st minute and 50th second in the video X while detecting a media switching operation, the target terminal may switch from displaying the image frame 12 to displaying the image frame 13 at the 5th second in the video Y, and continue to display image frames in the video Y that are after the 5th second, as shown in FIG. 1B. When the target terminal is playing an image frame at the 30th second in the video Y while detecting a target triggering operation, the target terminal may switch from displaying the image frame at the 30th second to displaying the image frame at the 58th second in the video Y, and continue to display image frames in the video Y that are after the 58th second. It is to be understood that some embodiments are described only using the example where the video Y includes two starting points that the target user is interested in. In practical applications, the number of starting points that the target user is interested in as determined according to the user preference profile of the target user is not limited to 2, but may also be 3, 4, or even more.

Figure 2:
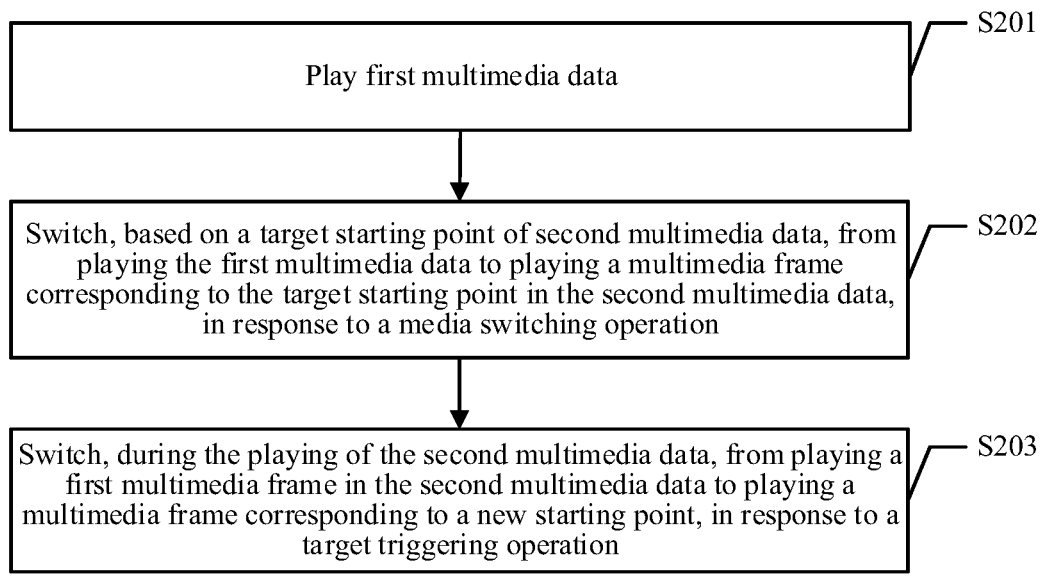
FIG. 2 is a schematic flowchart of a multimedia playback method according to some embodiments.

Based on the relevant descriptions of the above multimedia playback solution, some embodiments further provide a multimedia playback method. The multimedia playback method may be executed by the target terminal mentioned above, or executed jointly by the target terminal and the server. For ease of description, some embodiments are mainly described using an example where the multimedia playback method is executed by the target terminal. As shown in FIG. 2, the multimedia playback method may include the following operations S201-S203.

S201. Play first multimedia data.

The first multimedia data may be any multimedia data in a first data set, and multimedia data in the first data set is arranged in sequence and played in sequence. The first data set may be a video set (such as a film and television drama including a plurality of film and television videos, a video collection including a plurality of game videos of a game, a video collection including a plurality of short videos, etc.). The first data set may also be a music set (such as a music album of a singer, a music collection including a plurality of popular music, a music collection including a plurality of music of the same music style (such as lyrical style, rock style, etc.), an opera collection including a plurality of operas, etc.). Correspondingly, the first multimedia data may be any video in the video set (such as a film and television video, a game video, a short video, etc.), or any music in the music set (such as popular music, opera, etc.), which is not limited herein. For a short video scenario, a data set may be composed of short videos under one video channel, i.e., one data set corresponds to one video channel. The video channel herein may include, but is not limited to: a video recommendation channel, a video follow channel, a same-city channel, etc. In some embodiments, a dataset may be composed of short videos under the same theme (or topic). The topic herein may include: a travel theme, a food theme, a funny theme, etc. In some embodiments, a dataset may be composed of short videos published by the same user.

The first multimedia data may include multimedia frames corresponding to a plurality of time points. The term "plurality of" mentioned herein means at least two. When playing the first multimedia data for a target user (that is, a user using the target terminal), the target terminal may play the first multimedia data starting from a multimedia frame corresponding to the first time point in the first multimedia data (that is, a head multimedia frame), or may play the first multimedia data starting from a multimedia frame corresponding to a first starting point of the first multimedia data, which is not limited herein. The first starting point is a time point in which the target user may be interested, which is determined among the plurality of time points of the first multimedia data according to at least one of a user preference profile of the target user and hot spot information of the first multimedia data. By playing the first multimedia data starting from the first starting point, the attention of the target user can be quickly attracted to a great extent, making the target user more willing to continue playing the first multimedia data, thereby effectively improving the user stickiness of the first multimedia data. Moreover, by reducing the playback of useless multimedia frames (that is, multimedia frames that the target user is not interested in), processing resources can also be effectively saved, and the playback efficiency of the first multimedia data can be improved.

During the playing of the first multimedia data, the target user may input different media switching operations to trigger the target terminal to select the second multimedia data from the corresponding data set and switch from playing the first multimedia data to playing the second multimedia data. Correspondingly, if detecting the media switching operation, the target terminal may execute S202. In an implementation, the media switching operation may include a first interaction operation for instructing to perform multimedia switching in a same data set, a second interaction operation for instructing to perform multimedia switching in different data sets, etc. Any of the first interaction operation and the second interaction operation may be inputted in any of following manners: a gesture, voice, triggering a switching element on a terminal screen, and triggering a terminal physical key (such as a volume key, a power key, etc.). The switching element may include a switching component or a blank area in the terminal screen, where the switching component is displayed on the terminal screen during the playing of the first multimedia data.

When any of the first interaction operation and the second interaction operation is inputted through a gesture, the first interaction operation may include an operation of inputting a first gesture, and the second interaction operation may include an operation of inputting a second gesture. The first gesture and the second gesture mentioned herein may be set in advance according to an empirical value or a service requirement, or may be set by the target user through the target terminal as needed, which is not limited herein. For example, the first gesture may be a gesture of sliding left and right, and the second gesture may be a gesture of sliding up and down. For another example, the first gesture may be a gesture for inputting "M", and the second gesture may be a gesture for inputting "N". The target user may input the first gesture or the second gesture by touching the terminal screen, or may input the first gesture or the second gesture by mid-air sensing, which is not limited herein. In a case where the target user inputs the first gesture or the second gesture through mid-air sensing, the target user may not touch the terminal screen, but makes the first gesture or the second gesture in front of a camera component (such as a front-facing camera) of the target terminal, so that the target terminal can acquire the first gesture or the second gesture through the camera component.

When any of the first interaction operation and the second interaction operation is inputted through voice, the first interaction operation may include an operation of inputting a first voice, and the second interaction operation may include an operation of inputting a second voice. The first voice and the second voice mentioned herein may be set in advance according to an empirical value or a service requirement, or may be set by the target user through the target terminal as needed, which is not limited herein. For example, the first voice may be "please perform media switching in the same data set", and the second voice may be "please perform media switching in different data sets". For another example, the first voice may be "switch to the next multimedia data in the same data set", and the second voice may be "switch to the previous data set".

When any of the first interaction operation and the second interaction operation is inputted by triggering the switching element on the terminal screen, the first interaction operation and the second interaction operation may be inputted by triggering different switching elements. In this case, a first switching element and a second switching element may be displayed on the terminal screen of the target terminal. The first interaction operation may include a triggering operation for the first switching element (i.e., a first blank area or the first switching component) on the terminal screen. The second interaction operation may include a triggering operation for the second switching component (i.e., a second blank area or the second switching component) on the terminal screen. The number of the first blank area, the number of the second blank area, the number of the first switching component and the number of the second switching component may be one or more, which is not limited herein. In some embodiments, the first interaction operation or the second interaction operation may also be inputted by triggering the same switching element with different triggering operations. In this case, a target switching element (i.e., a target blank space or a target switching component) may be displayed on the terminal screen of the target terminal. The first interaction operation may include a first triggering operation (such as a double-click operation or a single-click operation) for the target switching element. The second interaction operation may include a second triggering operation (such as a touch and hold operation) for the target switching element.

When any of the first interaction operation and the second interaction operation is inputted by triggering the terminal physical key, the first interaction operation and the second interaction operation may be inputted by triggering different terminal physical keys. In this case, a first terminal physical key and a second terminal physical key may be arranged on the target terminal. The first interaction operation may include a triggering operation for the first terminal physical key (such as a volume key). The second interaction operation may include a triggering operation for the second terminal physical key (such as a power key). The number of the first terminal physical key and the number of the second terminal physical key may one or more, which is not limited herein. In some embodiments, the first interaction operation or the second interaction operation may also be inputted by triggering the same terminal physical key with different triggering operations. In this case, a target terminal physical key may be arranged on the target terminal. The first interaction operation may include a first triggering operation (such as a double-click operation) for the target terminal physical key. The second interaction operation may include a second triggering operation (such as a touch and hold operation) for the target terminal physical key.

S202. Switch, based on a target starting point of second multimedia data, from playing the first multimedia data to playing a multimedia frame corresponding to the target starting point in the second multimedia data, in response to a media switching operation.

The second multimedia data may include multimedia frames corresponding to a plurality of time points, and one time point corresponds to one multimedia frame. The plurality of time points in the second multimedia data may include pre-configured P candidate starting points, P being a positive integer greater than 1. The target starting point belongs to the P candidate starting points, and may specifically be the first candidate starting point, the second candidate starting point, or the last candidate starting point among the P candidate starting points, which is not limited herein. In an implementation, the P candidate starting points may be pre-configured according to one or more of the user preference profile of the target user and the hot spot information of the second multimedia data. That is to say, the target starting point mentioned in S202 may be determined according to the user preference profile of the target user, may be determined according to the hot spot information of the second multimedia data, or may be determined according to both the user preference profile of the target user and the hot spot information of the second multimedia data, which is not limited herein.

It can be seen that the target starting point is essentially one of the plurality of time points of the second multimedia data. Based on this, a specific implementation of S202 may be: playing a target multimedia frame corresponding to the target starting point in response to the media switching operation, the target multimedia frame being a multimedia frame corresponding to the target starting point in the second multimedia data; and after the playing of the target multimedia frame is finished, continuing to play a remaining multimedia frame located after the target multimedia frame in the second multimedia data. The phrase "continuing to play" mentioned herein may mean: continuing to play frames in sequence, continuing to play frames in a frame skipping manner, etc. If the target multimedia frame is the fifth frame of the second multimedia data, continuing to play frames in sequence means: continuing to play the sixth frame, the seventh frame, the eighth frame, and so on; and continuing to play frames in a frame skipping manner means: continuing to play the seventh frame, the eighth frame, the tenth frame, and so on.

For example, it is assumed that the first multimedia data is music A, the second multimedia data is music B, and the 30th second in the music B is the target starting point. In this case, if a media switching operation is detected when the playback reaches an audio frame at the 3rd minute and 15th second of the music A, switch from the music A to the music B, start to play an audio frame at the 30th second of the music B, and continue to play music frames in the music B that are after the 30th second. For another example, it is assumed that the first multimedia data is a video A, the second multimedia data is a video B, and the 5th second in the video B is the target starting point. In this case, if a media switching operation is detected when the playback reaches an image frame at the 30th minute and 15th second of the video A, switch from the video A to the video B, start to display an image frame at the 5th second of the video B, and continue to play image frames in the video B that are after the 5th second.

It may be seen from the above that the media switching operation may include the first interaction operation or the second interaction operation, the first interaction operation is used for instructing to perform media switching in the same data set, and the second interaction operation is used for instructing to perform media switching in different data sets. Therefore, it may be seen that the manner in which the second multimedia data involved in S202 is determined varies with different media switching operations. In an implementation, the second multimedia data is determined in the following manner:

(1) When the media switching operation includes the first interaction operation, the target terminal may determine the second multimedia data from the first data set to which the first multimedia data belongs. That is, in this case, the second multimedia data is multimedia data in the first data set other than the first multimedia data. Multimedia data in the first data set is arranged in sequence and played in sequence, and the second multimedia data may be located before or after the first multimedia data. It may be understood that, when the second multimedia data is located before the first multimedia data, the second multimedia data is multimedia data that has been played; when the second multimedia data is located after the first multimedia data, the second multimedia data is multimedia data that has not been played. In an implementation, after detecting the first interaction operation, the target terminal may, by default, select the second multimedia data from the multimedia data located after the first multimedia data in the first data set. In some embodiments, after detecting the first interaction operation, the target terminal may determine operation information of the first interaction operation; and if the operation information of the first interaction operation is first information, may select the second multimedia data from the multimedia data located after the first multimedia data in the first data set; or if the operation information of the first interaction operation is second information, may select the second multimedia data from the multimedia data located before the first multimedia data in the first data set.

For example: ① When the first interaction operation includes the operation of inputting the first gesture, the operation information of the first interaction operation may include a gesture trajectory of the first gesture. The first information may be a first trajectory, and the second information may be a second trajectory. For example, assuming that the first gesture is a gesture of sliding left and right, the first trajectory may be a trajectory of sliding from left to right, and the second trajectory may be a trajectory of sliding from right to left. Assuming that the first gesture is the gesture of inputting "M", the first trajectory may be a trajectory of drawing "M" from left to right, and the second trajectory may be a trajectory of drawing "M" from right to left. ② When the first interaction operation includes the operation of inputting the first voice, the operation information of the first interaction operation may include a voice content of the first voice. The first information may be a first content (e.g., "switch to playing the next multimedia data in the same data set"), and the second information may be a second content (e.g., "switch to playing previous multimedia data in the same data set"). 3. When the first interaction operation includes the triggering operation for the first switching element, and if the number of the first switching elements is 2 or more, the operation information of the first interaction operation may include an element identifier of the triggered first switching element. The first information may be an element identifier of the 1st first switching element, and the second information may be an element identifier of the 2nd first switching element. If the number of the first switching elements is one, the operation information of the first interaction operation may include a triggering manner for the first switching element, the first information may be a first manner (e.g., double-click), and the second information may be a second manner (e.g., touch and hold). ④ When the first interaction operation is inputted by triggering the terminal physical key, the operation information involved is similar to the operation information mentioned in the case ③ of the first interaction operation, and the details will not be repeated here.

(2) When the media switching operation includes the second interaction operation, the target terminal may select multimedia data that comes first in the second data set as the second multimedia data by default; or may determine the second multimedia data from the second data set according to the user preference profile of the target user, or according to the hot spot information of the second multimedia data, or according to the user preference profile and the hot spot information of the second multimedia data. That is, in this case, the second multimedia data is multimedia data determined in the second data set according to one or more of the user preference profile of the target user and the hot spot information of the second multimedia data. The second data set is selected from data sets in a multimedia playlist other than the first data set. Data sets in the multimedia playlist are arranged in sequence and played in sequence. The first data set may be a data set that comes first in the multimedia playlist, or may be data sets at other arrangement positions, which is not limited herein. The data sets located after the first data set may be: candidate data sets determined in real time or periodically according to one or more of the user preference profile of the target user and the hot spot information of the second multimedia data. Each candidate data set may include at least one multimedia data determined according to one or more of the user preference profile and the hot spot information of the second multimedia data.

The second data set mentioned in some embodiments may be located before or after the first data set. It may be understood that, when the second data set is located before the first data set, although the second data set is a data set that has been played, the second multimedia data may be multimedia data that has been played or may be multimedia data that has not been played, which is not limited herein. For example, it is assumed that the multimedia playlist includes a dataset A, a dataset B, . . . , and a dataset G; the first data set is the data set B, the second data set is the data set A, and the second multimedia data is multimedia data that comes second in the second data set. In this case, if the target user switches to playing the data set B after playing the multimedia data that comes first in the data set A, the second multimedia data has not been played. When the second data set is located after the first data set, the second data set is a data set that has not been played, and the second multimedia data is multimedia data that has not been played.

The target terminal may select the second data set from the multimedia playlist in any one of the following manners: In an implementation, after detecting the second interaction operation, the target terminal may select the second data set by default from data sets in a multimedia recommendation list that are located after the first data set. In some embodiments, after detecting the second interaction operation, the target terminal may determine operation information of the second interaction operation; and if the operation information of the second interaction operation is third information, may select the second data set from data sets in the multimedia playlist that are located after the first data set; or if the operation information of the second interaction operation is fourth information, may select the second data set from data sets in the multimedia playlist that are located before the first data set.

For example: ① When the second interaction operation includes the operation of inputting the second gesture, the operation information of the second interaction operation may include a gesture trajectory of the second gesture. The third information may be a third trajectory, and the fourth information may be a fourth trajectory. For example, assuming that the second gesture is the gesture of sliding up and down, the third trajectory may be a trajectory of sliding from up to down, and the fourth trajectory may be a trajectory of sliding from down to up. Assuming that the second gesture is the gesture of inputting "N", the third trajectory may be a trajectory of drawing "N" from left to right, and the fourth trajectory may be a trajectory of drawing "N" from right to left. ② When the second interaction operation includes the operation of inputting the second voice, the operation information of the second interaction operation may include a voice content of the second voice. The third information may be a third content (e.g., "switch to playing the previous data set"), and the fourth information may be a fourth content (e.g., "switch to playing the next data set"). ③ When the second interaction operation includes the triggering operation for the second switching element, and if the number of the second switching elements is 2 or more, the operation information of the second interaction operation may include an element identifier of the triggered second switching element. The third information may be an element identifier of the 1st second switching element, and the fourth information may be an element identifier of the 2nd second switching element. If the number of the second switching elements is one, the operation information of the second interaction operation may include a triggering manner for the second switching element, the third information may be a third manner (e.g., single-click or double-click), and the fourth information may be a fourth manner (e.g., press or touch and hold). ④ When the second interaction operation is inputted by triggering the terminal physical key, the operation information involved is similar to the operation information mentioned in the case ③ of the second interaction operation, and the details will not be repeated here.

Based on the relevant descriptions of the above operations S201-S202, specific scenarios where the target user inputs different interaction operations (that is, media switching operations) to triggering the terminal to switch to playing different second multimedia data are described exemplarily with reference to several specific examples where the first multimedia data is a video B in a film and television drama 1.

Figure 3A:
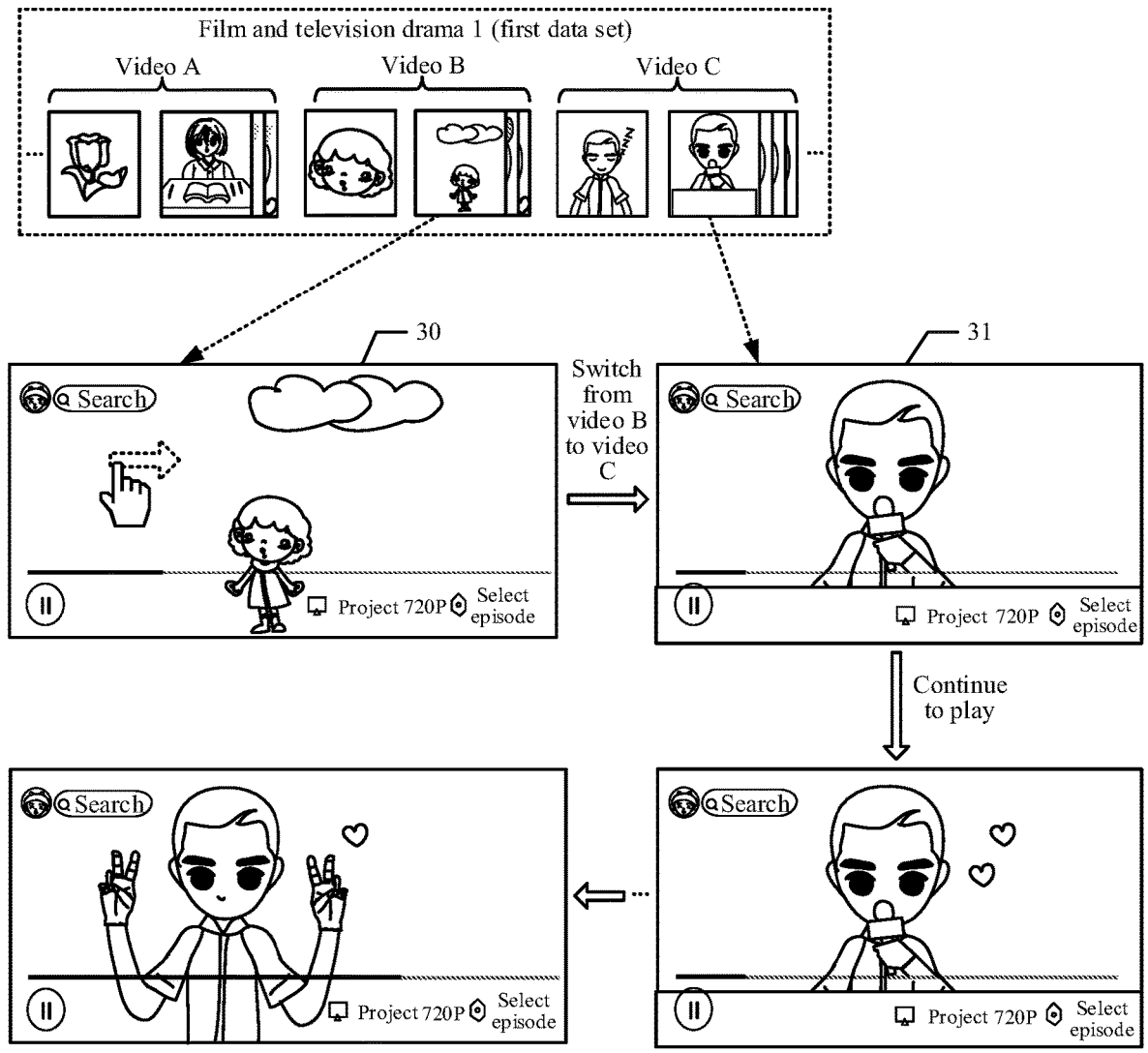
FIG. 3A is a schematic diagram of switching from first multimedia data to second multimedia data according to some embodiments.
Figure 3B:
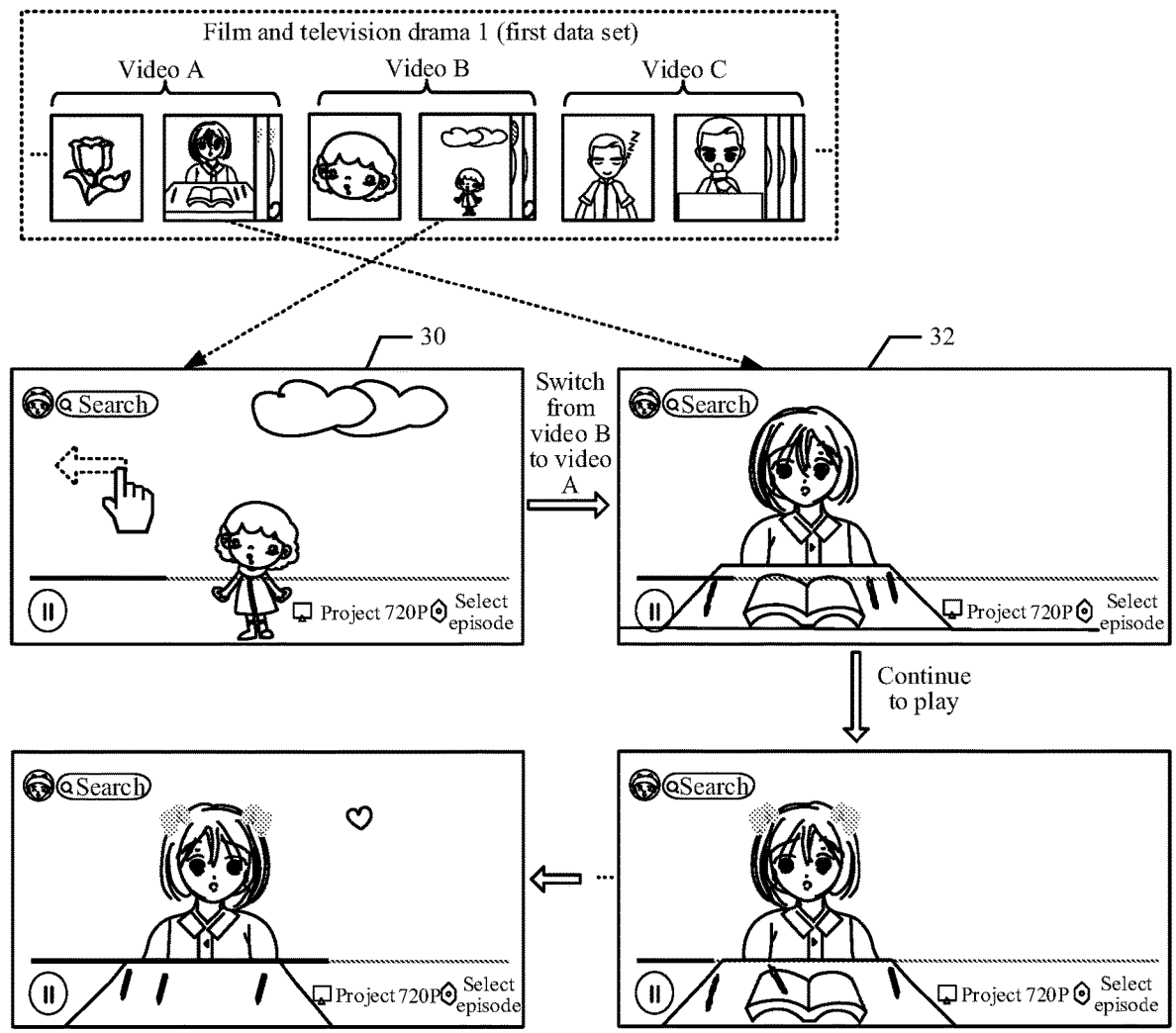
FIG. 3B is another schematic diagram of switching from first multimedia data to second multimedia data according to some embodiments.

In Example 1, it is assumed that any of the first interaction operation and the second interaction operation is inputted by a gesture. If the target user slides a finger from left to right on the terminal screen to input the first gesture (that is, the first interaction operation) when an image frame 30 in the video B is played, the target terminal may select a video C as the second multimedia data from videos in the film and television drama 1 that are after the video B, and determine the 5th second in the video C as the target starting point. Then, the target terminal may switch from displaying the image frame 30 in the video B to displaying an image frame 31 at the 5th second in the video C, and continue to display subsequent image frames, as shown in FIG. 3A. If the target user inputs the first gesture by sliding from right to left on the terminal screen, the target terminal may select a video A as the second multimedia data from videos in the film and television drama 1 that are before the video B, and determine the 15th second in the video A as the target starting point. Then, the target terminal may switch from displaying the image frame 30 in the video B to displaying an image frame 32 at the 15th second in the video A, and continue to display subsequent image frames, as shown in FIG. 3B.

Figure 3C:
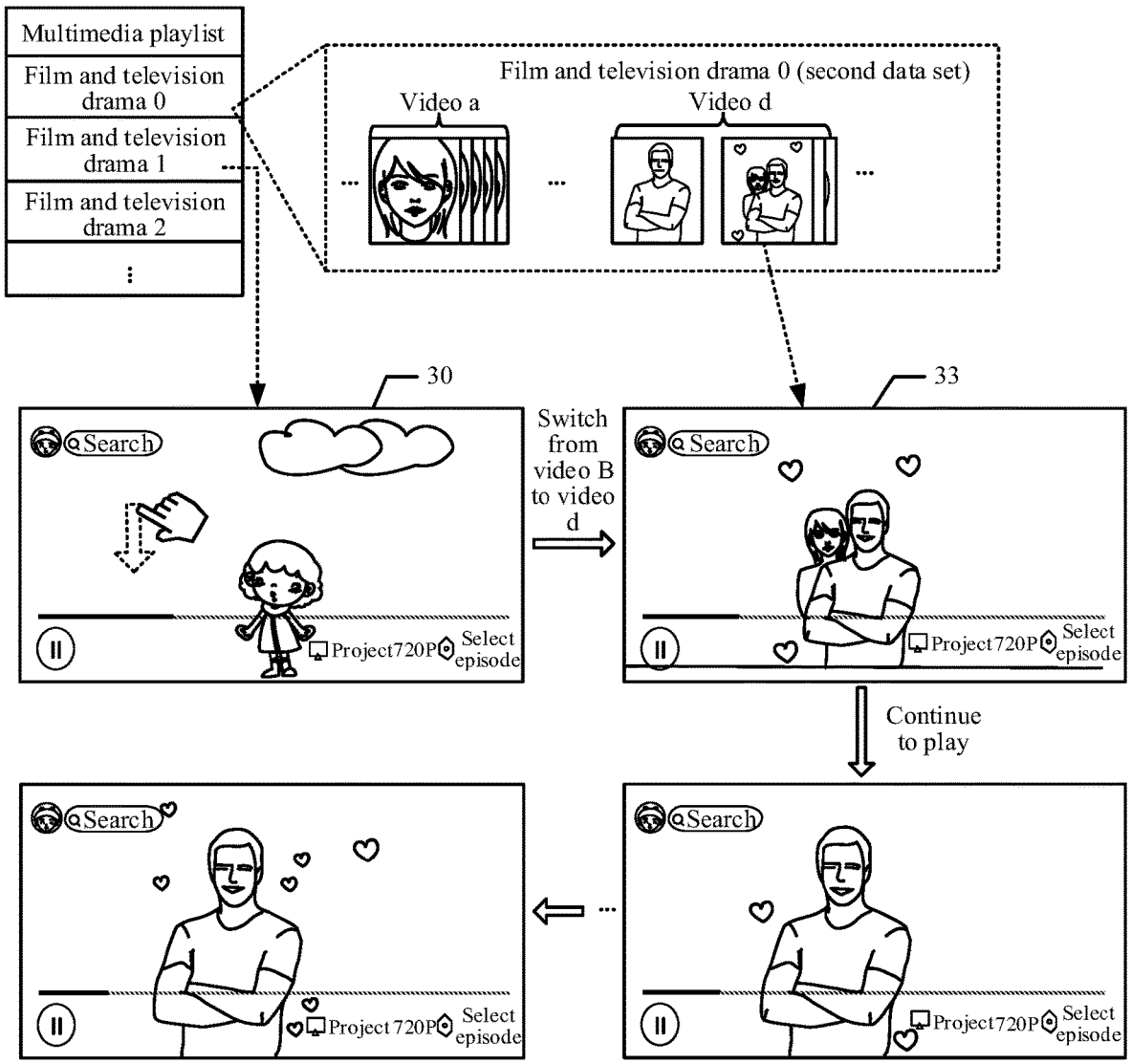
FIG. 3C is another schematic diagram of switching from first multimedia data to second multimedia data according to some embodiments.
Figure 3D:
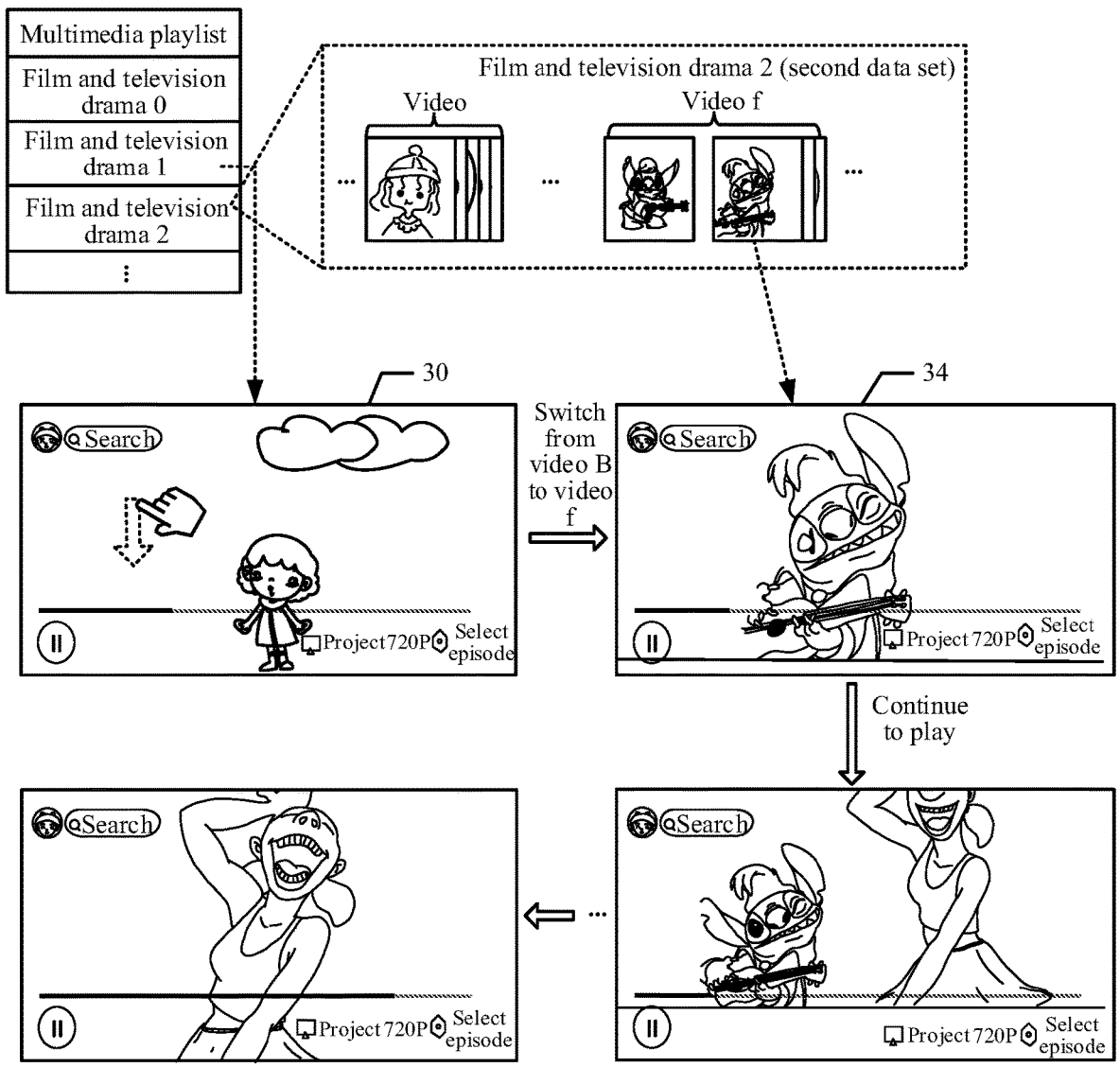
FIG. 3D is another schematic diagram of switching from first multimedia data to second multimedia data according to some embodiments.

If the target user inputs the second gesture (that is, the second interaction operation) by sliding a finger from up to down on the terminal screen, the target terminal may select a film and television drama 0 as the second data set from film and television dramas in the multimedia playlist that are before the film and television drama 1, determine a video d in the film and television drama 0 as the second multimedia data, and determine the 16th second in the video d as the target starting point. Then, the target terminal may switch from displaying the image frame 30 in the video B to displaying an image frame 33 at the 16th second in the video d, and continue to display subsequent image frames, as shown in FIG. 3C. If the target user inputs the second gesture by sliding a finger from down to up on the terminal screen, the target terminal may select a film and television drama 2 as the second data set from film and television dramas in the multimedia playlist that are after the film and television drama 1, determine a video f in the film and television drama 2 as the second multimedia data, and determine the 36th second in the video f as the target starting point. Then, the target terminal may switch from displaying the image frame 30 in the video B to displaying an image frame 34 at the 36th second in the video f, and continue to display subsequent image frames, as shown in FIG. 3D.

Figure 3E:
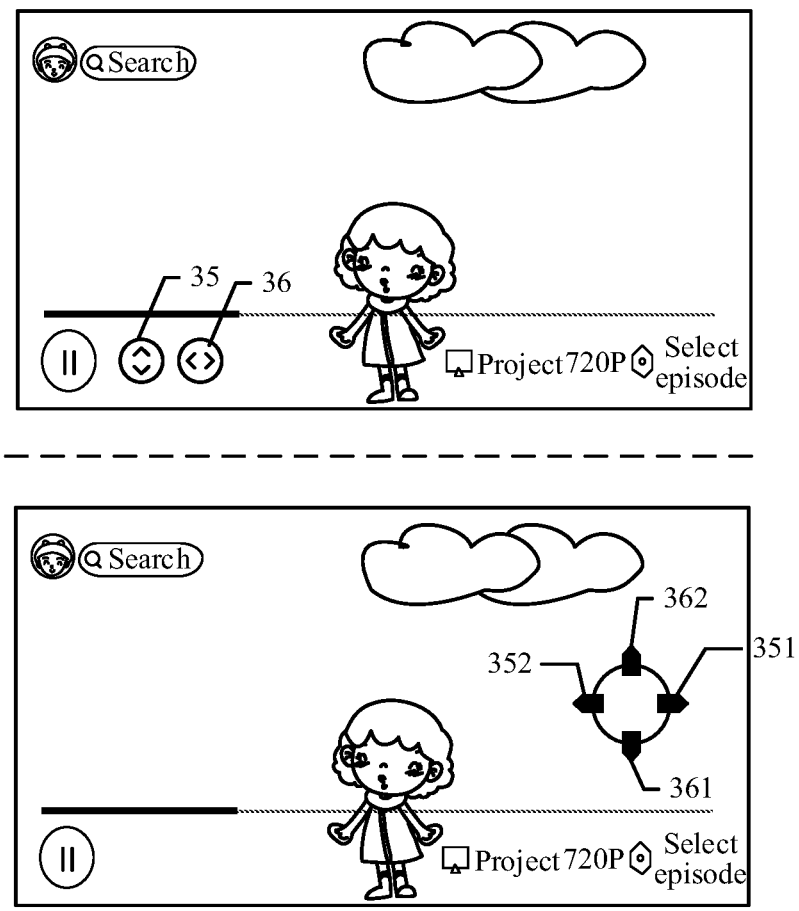
FIG. 3E is a schematic diagram of a switching component according to some embodiments.

In Example 2, it is assumed that any of the first interaction operation and the second interaction operation is inputted by triggering the switching component, the target terminal may display a first switching component 35 and a second switching component 36 on the terminal screen, as shown in a left part of FIG. 3E. During playing of the image frame 30 in the video B, if the target user performs a single-click operation on the first switching component 35 (i.e., inputs the first interaction operation in the first manner), the target terminal may switch from displaying the image frame 30 in the video B to displaying the image frame 31 at the 5th second in the video C. If the target user performs a double-click operation on the first switching component 35 (i.e., inputs the first interaction operation in the second manner), the target terminal may switch from displaying the image frame 30 in the video B to displaying the image frame 32 at the 15th second in the video A. If the target user performs a single-click operation on the second switching component 36 (i.e., inputs the second interaction operation in the third manner), the target terminal may switch from displaying the image frame 30 in the video B to displaying the image frame 33 at the 16th second in the video d. If the target user performs a double-click operation on the second switching component 36 (that is, inputs the second interaction operation in the fourth manner), the target terminal may switch from displaying the image frame 30 in the video B to displaying the image frame 34 at the 36th second in the video f.

In some embodiments, the number of the first switching components and the number of the second switching components are both 2. For example, the target terminal may display a first switching component 351, a first switching component 352, a second switching component 361, and a second switching component 362 on the terminal screen, as shown in a right part of FIG. 3E. During playing of the image frame 30 in the video B, if the target user performs a triggering operation on the first switching component 351, the target terminal may switch from displaying the image frame 30 in the video B to displaying the image frame 31 at the 5th second in the video C. If the target user performs a triggering operation on the first switching component 352, the target terminal may switch from displaying the image frame 30 in the video B to displaying the image frame 32 at the 15th second in the video A. If the target user performs a triggering operation on the second switching component 361, the target terminal may switch from displaying the image frame 30 in the video B to displaying the image frame 33 at the 16th second in the video d. If the target user performs a triggering operation on the second switching component 362, the target terminal may switch from displaying the image frame 30 in the video B to displaying the image frame 34 at the 36th second in the video f.

It is to be understood that, FIG. 3A-FIG. 3E only exemplarily show schematic interface diagrams when the target terminal is playing a video, and is not limited thereto. For example, when the terminal screen includes a switching component, the product form of the switching component is not limited to that shown in FIG. 3E. The switching component may also be a "Select episode" component shown in FIG. 3A-FIG. 3E, etc. It may be known from the relevant descriptions of the above operations S201-S202 that the first multimedia data and the second multimedia data may both be played starting from a starting point. Similarly, the target terminal may also play multimedia data other than the first multimedia data and the second multimedia data starting from a certain starting point. That is to say, for any multimedia data, in response to not detecting a media switching operation, the target terminal may also determine a starting point of the any multimedia data according to one or more of the user preference profile of the target user and hot spot information of the any multimedia data, and play the any multimedia data starting from the determined starting point.

S203. Switch, during the playing of the second multimedia data, from playing a first multimedia frame in the second multimedia data to playing a multimedia frame corresponding to a new starting point, in response to a target triggering operation.

The target starting point is one of the P candidate starting points, and each candidate starting point can attract the attention of the target user to a certain extent. Based on this, in the process of playing the second multimedia data based on the target starting point, the target terminal may also support the target user in inputting a target triggering operation to trigger the target terminal to switch from playing the first multimedia frame (which is a multimedia frame played in response to the target triggering operation) to playing the multimedia frame corresponding to the new starting point (which is a candidate starting point among the P candidate starting points other than the target starting point), so as to quickly switch to playing the new multimedia frame that the target user is interested in (that is, the multimedia frames corresponding to the new starting point), thereby improving the user stickiness and playback efficiency. Correspondingly, in response to detecting a target triggering operation during the playing of the second multimedia data based on the target starting point, switching from playing the first multimedia frame to playing the multimedia frame corresponding to the new starting point may be performed; and after the playing of the multimedia frame corresponding to the new starting point is finished, multimedia frames corresponding to time points after the new starting point in the second multimedia data continue to be played.

The target triggering operation may be set according to an empirical value or a service requirement, or may be set by the target user through the target terminal as needed, as long as the target triggering operation does not conflict with the media switching operation mentioned above. In an implementation, the target user may input a specified target triggering operation to trigger the target terminal to randomly select a candidate starting point from the P candidate starting points other than the target starting point as the new starting point. In another implementation, the target user may input different target triggering operations to trigger the target terminal to select a new starting point from the P candidate starting points by using different starting point selection logics. Specifically, the target triggering operation may include: a first progress adjustment operation (or called "fast-forward operation") used for instructing to select a new starting point from candidate starting points later than a first time point corresponding to the first multimedia frame, or a second progress adjustment operation (or referred to as a "backward operation") used for instructing to select a new starting point from candidate starting points earlier than the first time point, or a custom selection operation for the P candidate starting points, etc.

In a case that the target triggering operation includes the custom selection operation for the P candidate starting points, the new starting point may be a candidate starting point determined among the P candidate starting points according to the custom selection operation. In an implementation, an identification option of each candidate starting point may be displayed on the terminal screen. In this implementation, the custom selection operation may include: an operation of selecting any one of the identification options; and the new starting point is the candidate starting point corresponding to the selected identification option. In some embodiments, a starting point component may be displayed on the terminal screen. In this implementation, the custom selection operation may include: a custom triggering operation for the starting point component. The custom triggering operation may be a click operation of clicking or continuously clicking the starting point component within a preset time period. In this case, the new starting point may be a candidate starting point determined according to the number of clicks involved in the click operation. For example, when the number of clicks is 1, the new starting point may be the earliest candidate starting point among the P candidate starting points other than the target time point. When the number of clicks is 2, the new starting point may be the second earliest candidate starting point among the P candidate starting points other than the target time point. In some embodiments, the custom triggering operation may be a touch and hold operation of touching and holding on the starting point component. In this case, the new starting point may be a candidate starting point determined according to a holding duration involved in the touch and hold operation. For example, when the holding duration is 1 second, the new starting point may be the earliest candidate starting point among the P candidate starting points other than the target time point. When the holding duration is 2 seconds, the new starting point may be the second earliest candidate starting point among the P candidate starting points other than the target time point.

In a case that the target triggering operation includes the first progress adjustment operation, the new starting point may be any candidate starting point later than the first time point corresponding to the first multimedia frame among the P candidate starting points. For example, the new starting point may be a candidate starting point that is later than the first time point and is closest to the first time point among the P candidate starting points, or a candidate starting point that is later than the first time point and is the second closest to the first time point, or a latest candidate starting point later than the first time point, etc. In a case that the target triggering operation includes the second progress adjustment operation, the new starting point may be any candidate starting point earlier than the target starting point among the P candidate starting points. For example, the new starting point may be a candidate starting point that is earlier than the first time point and is closest to the first time point among the P candidate starting points, or a candidate starting point that is earlier than the first time point and is the second closest to the first time point, or an earliest candidate starting point earlier than the first time point, etc. For another example, the new starting point may be a candidate starting point that is earlier than a target time point and is closest to the target time point among the P candidate starting points, or a candidate starting point that is earlier than the target time point and is the second closest to the target time point, etc.

It is to be understood that, similar to the first interaction operation and the second interaction operation mentioned above, any one of the first progress adjustment operation and the second progress adjustment operation may be inputted in any one of the following manners: a gesture, voice, triggering a progress adjustment element on the terminal screen, triggering a terminal physical key (such as a volume key, a power key, etc.), etc. That is to say, the first progress adjustment operation may be an operation of inputting a third gesture or a third voice, or an operation for a first progress adjustment element or a third terminal physical key, etc. The second progress adjustment operation may be an operation of inputting a fourth gesture or a fourth voice, or an operation for a second progress adjustment element or a fourth terminal physical key, etc. The third gesture and the fourth gesture mentioned herein may be determined according to a service requirement or a user requirement (or operating habit) of the target user, as long as the third gesture and the fourth gesture can be distinguished from the first gesture and the second gesture mentioned above. For example, if the first gesture and the second gesture mentioned above are gestures for inputting "M" and "N", the third gesture and the fourth gesture may respectively be a gesture of sliding from left to right and a gesture of sliding from left to right. For another example, if the first gesture and the second gesture mentioned above are respectively a gesture of sliding from left to right and a gesture of sliding from right to left, the third gesture and the fourth gesture may respectively be gestures of inputting "M" and "N".

The first progress adjustment operation and the second progress adjustment operation are respectively a gesture of sliding from left to right and a gesture of sliding from right to left, the sliding magnitudes of the first progress adjustment operation and the second progress adjustment operation may be related or unrelated to the result of selecting the new starting point. That the sliding magnitudes of the first progress adjustment operation and the second progress adjustment operation are unrelated to the result of selecting the new starting point means that when the target user inputs the first progress adjustment operation or the second progress adjustment operation, no matter how far the finger or other component (such as a stylus pen) slides on the terminal screen, the result of selecting the new starting point is not affected. For example, if the first progress adjustment operation specifically instructs to select the candidate time point later than the first time point and closest to the first time point as the new starting point, the target terminal always selects the candidate time point later than the first time point and closest to the first time point as the new starting point regardless of whether the target user slides the finger or other component (such as the stylus pen) for 1 cm, 5 cm, or even 10 cm on the terminal screen when inputting the first progress adjustment operation. Correspondingly, that the sliding magnitudes of the first progress adjustment operation and the second progress adjustment operation are related to the result of selecting the new starting point means that the result of selecting the new starting point is affected by the sliding magnitudes of the first progress adjustment operation and the second progress adjustment operation. For example, when the first progress adjustment operation instructs to select a candidate time point later than the first time point as the new starting point, the target terminal may select a candidate time point that is later than the first time point and is closest to the first time point as the new starting point if the target user slides the finger or other component (such as the stylus pen) for 1 cm on the terminal screen when inputting the first progress adjustment operation. The target terminal may select a candidate time point that is later than the first time point and is the second closest to the first time point as the new starting point if the target user slides the finger or other component (such as the stylus pen) for 5 cm on the terminal screen when inputting the first progress adjustment operation.

Figure 3F:
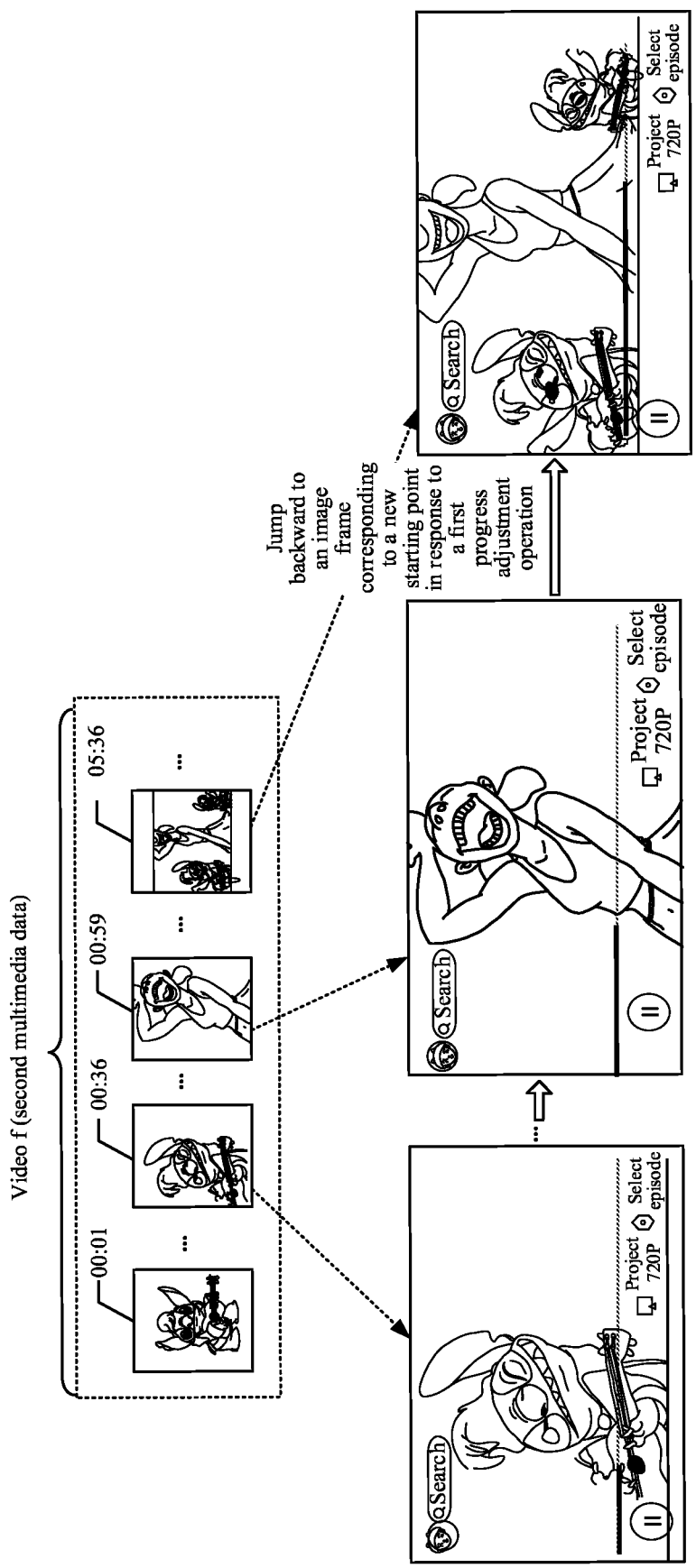
FIG. 3F is a schematic diagram of playing second multimedia data according to some embodiments.

Based on the related description of S203, how to switch to playing the multimedia frame of the new starting point is exemplarily described with reference to FIG. 3F by using an example where the target triggering operation includes the first progress adjustment operation. Specifically, for example, it is assumed that the second multimedia data is the video f as shown in FIG. 3D, the P candidate starting points of the second multimedia data include 00:36 (the 36th second), 05:36 (the 5th minute and 36th second), and 30:14 (the 30th minute and 14th second), and the target starting point is the 36th second. In this case, after playing a target image frame at the 36th second, the target terminal may continue to play remaining image frames after the 36th second. If detecting the first progress adjustment operation at the 59th second, the target terminal may determine the 5th minute and 36th second as the new starting point, and switch from playing the image frame at the 59th second (i.e., the first media frame) to playing an image frame at the 5th minute and 36th second. It is to be understood that FIG. 3F is described using an example where the second multimedia data is a target video, an implementation when the second multimedia data is music is similar to the implementation shown in FIG. 3F, and the details will not be repeated herein.

In some embodiments, if the target starting point is a time point among the plurality of time points other than the first time point, but the target user may intend to play starting from the head multimedia frame (that is, the multimedia frame corresponding to the first time point), the target terminal may also support the target user in inputting a head frame playback triggering operation in the process of playing the second multimedia data based on the target starting point, to trigger the target terminal to quickly jump from a second multimedia frame being currently played to the head multimedia frame, so as to play the second multimedia data starting from the head multimedia frame, thereby improving the user stickiness. The head frame playback triggering operation may be set according to an empirical value or a service requirement, or may be set by the target user through the target terminal as needed, as long as the head frame playback triggering operation does not conflict with the media switching operation and the target triggering operation (e.g., the first progress adjustment operation and the second progress adjustment operation) mentioned above. For example, the head frame playback triggering operation may be an operation of inputting a fifth gesture (e.g., a gesture of drawing a small circle, a gesture of inputting "L", etc.) or a fifth voice, or an operation for a head frame playback triggering component or a fifth terminal physical key, etc.

Figure 3G:
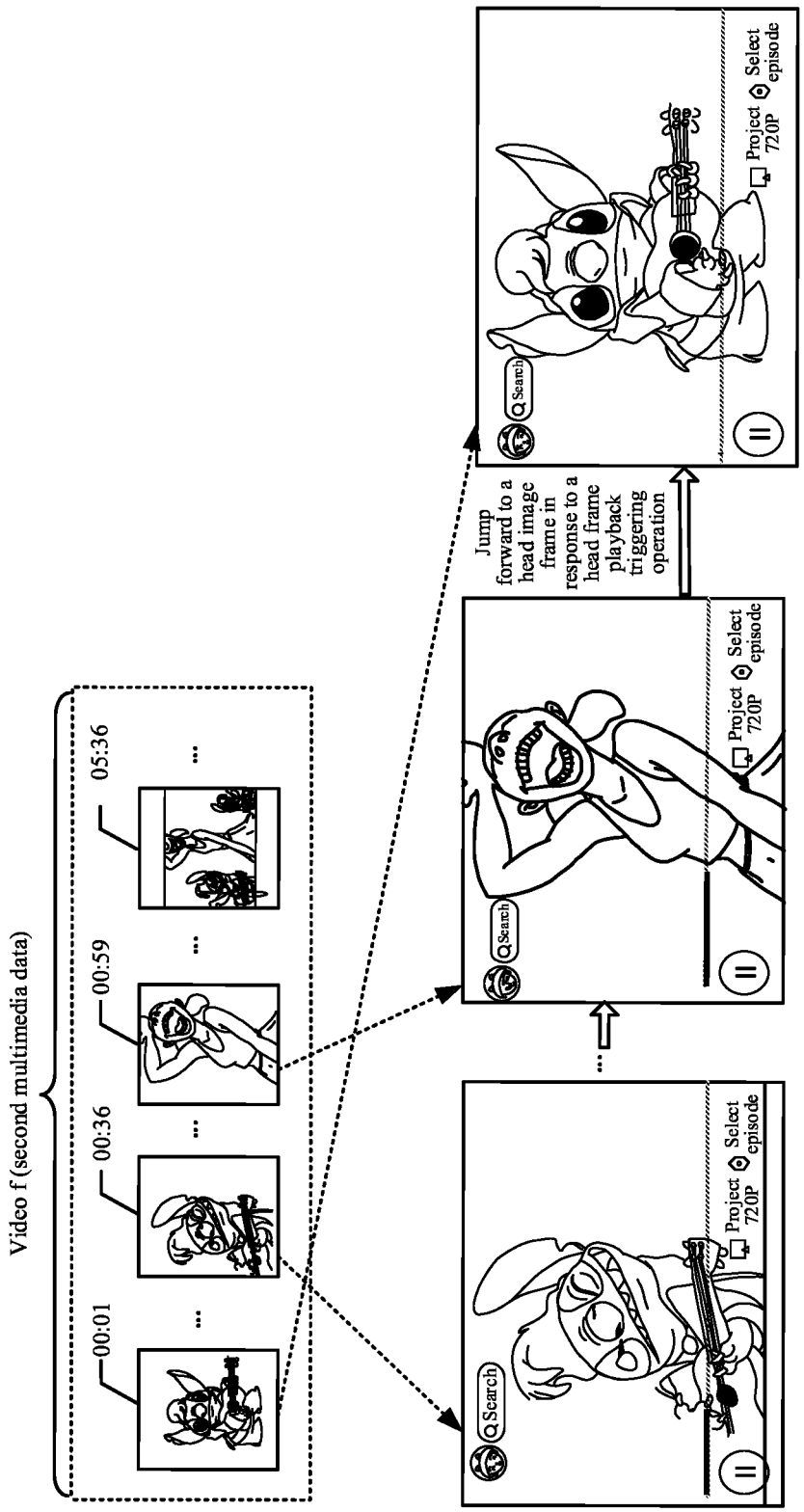
FIG. 3G is another schematic diagram of playing second multimedia data according to some embodiments.

That is to say, during the playing of the second multimedia data, i.e., during the playing of the target multimedia frame or the remaining multimedia frames, switching from playing the second multimedia frame to playing the multimedia frame corresponding to the first time point is performed in response to the first frame playback triggering operation, and after the playing of the multimedia frame corresponding to the first time point is finished, multimedia frames corresponding to time points after the first time point in the second multimedia data continue to be played. The second multimedia frame is a multimedia frame played at a moment at which the head frame playback triggering operation is performed. For example, if the target terminal detects the head frame playback triggering operation while playing the multimedia frame at the 35th second, the second multimedia frame is the multimedia frame at the 35th second. In an example where the second multimedia data is the target video, a schematic diagram of switching, by the target terminal, from playing a second image frame (the second multimedia frame) to playing a head image frame (that is, the multimedia frame at the first time point) in response to the head frame playback triggering operation may be as shown in FIG. 3G. It is to be understood that an implementation when the second multimedia data is music is similar to the implementation shown in FIG. 3G, and the details will not be repeated herein.

In some embodiments, P candidate starting points may be flexibly pre-configured for second multimedia data according to actual requirements, so that in response to a media switching operation during playing of first multimedia data, a target starting point may be flexibly selected from the P candidate starting points, and the second multimedia data starts to be played based on the target starting point in the second multimedia data, so that the flexibility of multimedia playback can be effectively improved. In addition, in response to a target triggering operation during playing of the second multimedia data, switching from a first multimedia frame to another multimedia frame that meets the actual requirements (that is, a multimedia frame corresponding to a new starting point) may be automatically performed by positioning and switching the playback point, thereby reducing the playback of useless multimedia frames (multimedia frames that do not meet the actual requirements). This not only can further improve the flexibility of multimedia playback, but also can effectively save processing resources and effectively improve the playback effectiveness and playback efficiency of the second multimedia data.

Figure 4:
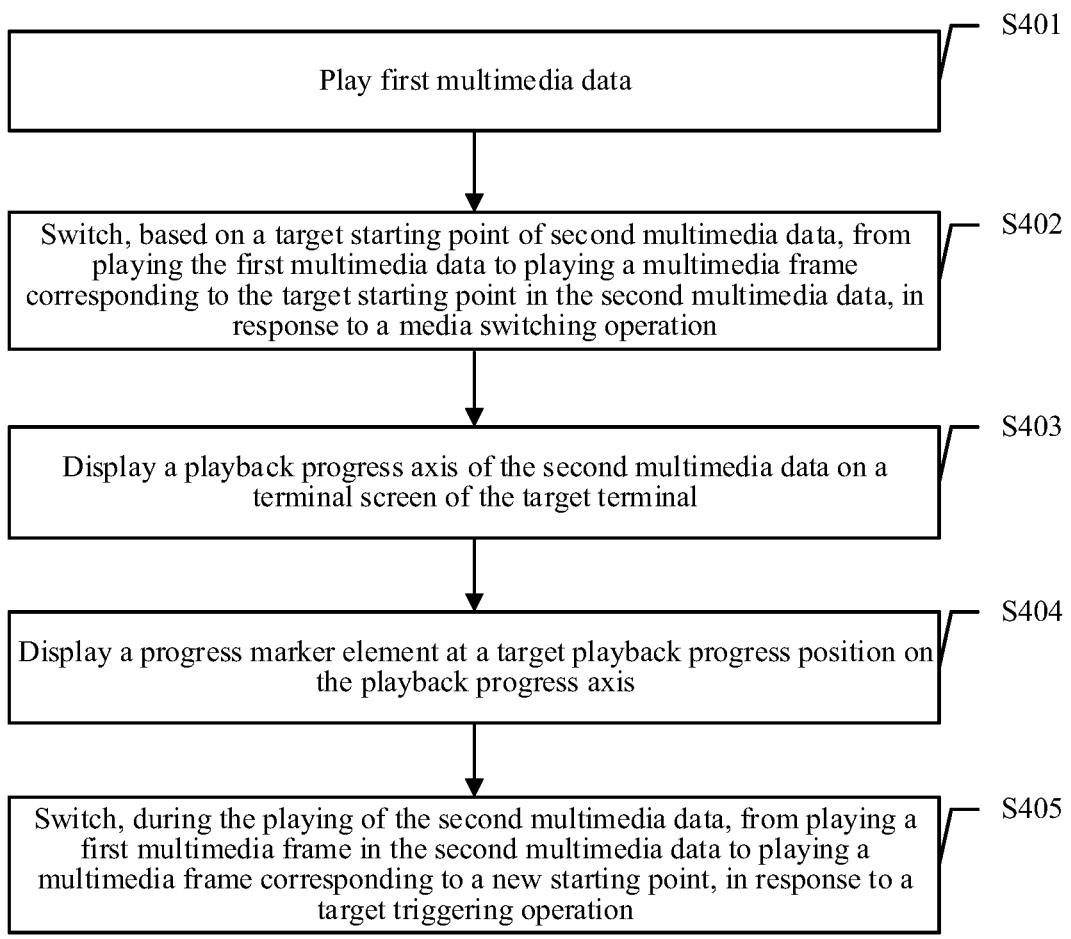
FIG. 4 is a schematic flowchart of a multimedia playback method according to some embodiments.

Based on the above descriptions, some embodiments further provide a multimedia playback method. The multimedia playback method may be executed by the target terminal mentioned above, or executed jointly by the target terminal and the server. For ease of description, some embodiments are mainly described using an example where the multimedia playback method is executed by the target terminal. As shown in FIG. 4, the multimedia playback method may include the following operations S401-S405.

S401. Play first multimedia data.

In a process of playing the first multimedia data, the target terminal may obtain a popularity value of each data set in a database, and add the data set with a large popularity value as a candidate data set into a multimedia recommendation list, so that in response to a second interaction operation, a second data set is selected from the multimedia recommendation list. In some embodiments, in the process of playing the first multimedia data, the target terminal may obtain a user preference profile of a target user. The user preference profile may be an initial user preference profile constructed according to user information of the target user (e.g., social information, surrounding environment information, etc.), or may be a profile obtained by updating the initial user preference profile according to multimedia history playback information of the target user, which is not limited herein. The user preference profile may include a first preference tag for multimedia matching and a second preference tag for starting point matching. The number of the first preference tag and the number of the second preference tag may one or more, which is not limited herein. The first preference tag and the second preference tag may be the same, different or partially the same. For example, the first preference tag may include "suspense drama", "funny", "emotional", and "star X", and the second preference tag may include "funny", "star X", "eating show", etc.

After obtaining the user preference profile, the target terminal may search the database for matching multimedia data according to the first preference tag in the user preference profile during the playing of the first multimedia data. The matching multimedia data is multimedia data corresponding to a data tag matching with the first preference tag, the matching multimedia data including one or more starting points. In an implementation, the target terminal may calculate a similarity between a feature vector of the first preference label and a feature vector of a data tag of each multimedia data in the database, and determine the multimedia data corresponding to the data tag corresponding to a similarity greater than a similarity threshold as the matching multimedia data. In some embodiments, a tag mapping table may be preset. The tag mapping table includes a mapping relationship between multiple data tags and multiple preset preference tags. The target terminal may first determine whether the first preference label exists in the multiple preset preference labels in the tag mapping table, and if yes, determine the multimedia data corresponding to the data tag mapped to the first preference label as the matching multimedia data.

Then, the target terminal may obtain a tag information set of the matching multimedia data, the tag information set of the matching multimedia data including tag information of the one or more starting points in the matching multimedia data; search the tag information set for matching tag information matching with the second preference tag; and determine the matching multimedia data to which the starting point corresponding to the matching tag information belongs as candidate multimedia data, and add a data set to which the candidate multimedia data belongs as a candidate data set to a multimedia recommendation list, so that a second data set is selected from the multimedia recommendation list in response to the second interaction operation. If a large number of pieces of matching multimedia data are selected, a weight of each matching multimedia data may further be calculated according to a weighted value of the first preference tag and a weighted value of the second preference tag, and a preset number of pieces of matching multimedia data are selected as candidate multimedia data in descending order of the weights. The weight of any matching multimedia data is calculated in the following manner: obtaining a first matching degree between the data tag of any matching multimedia data and the first preference tag and a second matching degree between the tag information of each starting point in the matching multimedia data and the second preference tag, weighting the first matching degree using the weighted value of the first preference label to obtain a first weighted value, weighting the second matching degree using the weighted value of the second preference label to obtain a second weighted value, and calculating a sum of the first weighted value and the second weighted value to obtain the weight of the matching multimedia data.

It may be known from the relevant description of S201 in the foregoing embodiments that the multimedia recommendation list may further include a first data set in addition to the candidate data sets, and an arrangement position of the first data set is located before an arrangement position of the candidate data sets. Considering that the target user may input the second interaction operation to trigger multimedia switching in different data sets, and in order to quickly play the second multimedia data based on the target starting point for the target user in response to detecting the second interaction operation, the target terminal may preload the data sets in the multimedia recommendation list, so that after detecting the second interaction operation, the target terminal may perform playback based on the preloaded data. Considering that the second multimedia data is generally selected from neighboring data sets of the first dataset (a historical data set immediately before the first data set and a candidate data set immediately after the first data set) in response to the second interaction operation, the target terminal may preload only the neighboring data sets of the first data set to save processing resources. The neighboring data sets may specifically be preloaded in the following manner: preloading multimedia data in the neighboring data sets, and multimedia frames corresponding to starting points of each multimedia data. In some embodiments, the neighboring data sets may specifically be preloaded in the following manner: preloading candidate multimedia data in the neighboring data sets and multimedia frames corresponding to starting points that match a user preference in each candidate multimedia data, to save processing resources.

The target terminal may further obtain a preference measurement value of the target user with respect to the first multimedia data after the multimedia recommendation list is determined, the preference measurement value being used for indicating a degree of preference of the target user for the first multimedia data. In an implementation, the target terminal may output inquiry information during the playing of the first multimedia data to inquire whether the target user likes the first multimedia data, and determine the preference measurement value according to response information inputted by the target user. In some embodiments, the target terminal may obtain the preference measurement value when the first multimedia data is switched. In this case, the target terminal may determine a duration for which the first multimedia data has been played, and use the duration as the preference measurement value; or the preference measurement value of the target user with respect to the first multimedia data determine according to a proportional relationship between the duration and the degree of preference.

After obtaining the preference measurement value, the target terminal may update the user preference profile of the target user according to the preference measurement value and a data tag of the first data set to which the first multimedia data belongs. If the preference measurement value is greater than or equal to a measurement threshold, the target terminal may add the data tag of the first multimedia data as a new first preference tag to the user preference profile of the target user to update the user preference profile. If the preference measurement value is less than the measurement threshold, the target terminal may search in the user preference profile for the first preference label matching the data tag of the first multimedia data, and delete the found first preference label to update the user preference profile. Then, the target terminal may update all or part of the candidate data set in the multimedia recommendation list according to the updated user preference profile. In an implementation, invalid candidate data sets may be searched among all or part of the candidate data sets in the multimedia recommendation list according to the updated user preference profile. The invalid candidate data set is a candidate data set including at least one multimedia data of which the data tag does not match the updated user preference profile. The invalid candidate data sets are deleted from the multimedia recommendation list to realize the updating of the multimedia recommendation list.

S402. Switch, based on a target starting point of second multimedia data, from playing the first multimedia data to playing a multimedia frame corresponding to the target starting point in the second multimedia data, in response to a media switching operation.

The second multimedia data may be target music or a target video, and the target starting point is one of the P candidate starting points. The P candidate starting points may be pre-configured according to one or more of the user preference profile of the target user and the hot spot information of the second multimedia data. In an implementation, the P candidate starting points may be configured using at least one of the following manners:

Configuration manner 1: The second multimedia data includes a plurality of starting points, and each of the starting points has tag information. The target terminal may calculate a matching degree between the user preference profile and the tag information of each of the starting points to obtain a calculation result. Next, the target terminal may select P target matching degrees greater than a matching threshold from the calculation result, or sequentially select P target matching degrees from the calculation result in descending order of the matching degrees. Then, the target terminal may determine the starting point corresponding to each target matching degree among the P target matching degrees as a candidate starting point. In this configuration mode, the target starting point may be selected in any one of the following manners:

In an implementation, an earliest candidate starting point may be selected from the P candidate starting points as the target starting point. That is, in this implementation, the target starting point is the first candidate starting point among the P candidate starting points. In some embodiments, the candidate starting point corresponding to a maximum matching degree may be selected from the P candidate starting points as the target starting point. That is, in this implementation, the target starting point is the candidate starting point having a maximum matching degree to the user preference profile among the P candidate starting points. In some embodiments, a popularity value of each candidate starting point among the P candidate starting points (where the popularity value is used to reflect the popularity of the multimedia frame corresponding to the candidate starting point) may be obtained, and the candidate starting point having a maximum popularity value is selected from the P candidate starting points as the target starting point. That is, in this implementation, the target starting point is the most popular candidate starting point among the P candidate starting points. The popularity value of any candidate starting point may be proportional to a number of historical playbacks or a historical playback frequency of a multimedia frame corresponding to the candidate starting point. The number of historical playbacks is a number of times the multimedia frame corresponding to the candidate starting point is played by users other than the target user. It is to be understood that the several specific implementations of selecting the target starting point from the P candidate starting points are described in some embodiments by way of example only, and are not exhaustive. For example, in some other embodiments, the target terminal may calculate a playback reasonableness measurement value of each candidate starting point by a weighted summation on the matching degree and the popularity value through preset weights, and select the target starting point from the P candidate starting points according to the playback reasonableness measurement value of each candidate starting point, and so on.

Configuration manner 2: The hot spot information of the second multimedia data may be used to indicate a multimedia frame with a large popularity value in the second multimedia data. The target terminal may determine a time point at which each multimedia frame indicated by the hot spot information is located as the P candidate starting points. In this configuration mode, the target starting point may be selected in any one of the following manners: selecting an earliest candidate starting point from the P candidate starting points as the target starting point; or selecting the target starting point from the P candidate starting points based on the user preference profile. For example, the target terminal may calculate a matching degree between the user preference profile and the tag information of each of the starting points, and then select the candidate starting point corresponding to a maximum matching degree from the P candidate starting points as the target starting point.

Configuration manner 3: A matching degree between the user preference profile and the tag information of each of the starting points is calculated to obtain a first recommendation score of the starting point. Each of the starting points is scored according to the hot spot information to obtain a second recommendation score of the starting point. A scoring rule may be: for any broadcast point, if the multimedia frame at the starting point belongs to the multimedia frames indicated in the hot spot information, the second recommendation score of the starting point is a valid score (e.g., "0.5", "1", etc.); otherwise, the second recommendation score of the starting point is an invalid score (e.g., "0"). Then, a weighted summation is performed on the first recommendation score and the second recommendation score of each starting point respectively, to obtain a target recommendation score of the starting point. Finally, P starting points corresponding to target recommendation scores greater than a score threshold may be selected as the P candidate starting points; or P target recommendation scores may be selected sequentially in descending order of the target recommendation scores, and the starting points corresponding to the selected target recommendation scores are determined as candidate starting points.

In this configuration mode, the target starting point may be selected in any one of the following manners: selecting an earliest candidate starting point from the P candidate starting points as the target starting point; or selecting the candidate starting point corresponding to a maximum first recommendation score from the P candidate starting points as the target starting point, in which case the target starting point is the candidate starting point having a maximum matching degree to the user preference profile among the P candidate starting points; or selecting the candidate starting point corresponding to a maximum first recommendation score from the P candidate starting points as the target starting point, in which case the target starting point is the most popular candidate starting point among the P candidate starting points.

In an implementation, when the second multimedia data is a target video, a multimedia frame corresponding to the target starting point in the target video is a target image frame. In this implementation, after detecting the media switching operation, the target terminal may play a switching animation first; after the playing of the switching animation is finished, play the second multimedia data starting from the target starting point of the second multimedia data. The switching animation may be an animation in which the target image frame and a current image frame of the first multimedia data (the image frame played at the moment at which the media switching operation is detected) are moved along a target direction. A displacement distance of the target image frame or the current image frame is defined as W, where W=screen width of the target terminal (when the target terminal is in landscape mode), or W=screen height of the target terminal (when the target terminal is in portrait mode). For a landscape image frame (that is, an image frame with more pixels in the horizontal direction than in the vertical direction), when the target terminal can display the landscape image frame in full screen, it may be considered that the target terminal is in landscape mode, and when the target terminal cannot display the landscape image frame in full screen, it may be considered that the target terminal is in portrait mode.

With the switching animation, the target image frame can be gradually displayed on the terminal screen. After the target image frame is completely displayed on the terminal screen, the playing of the switching animation ends. The target direction may be determined according to a specific media switching operation. For example, if the media switching operation is an operation of inputting a first gesture by sliding from left to right, the target direction may be from left to right because the second multimedia data is located after the first multimedia data, so as to intuitively prompt the target user that the second multimedia data is located after the first multimedia data. For another example, if the media switching operation is an operation of inputting a second gesture by sliding from up to down, the target direction may be from up to down because the second data set to which the second multimedia data belongs is located before the first data set.

Figure 5A:
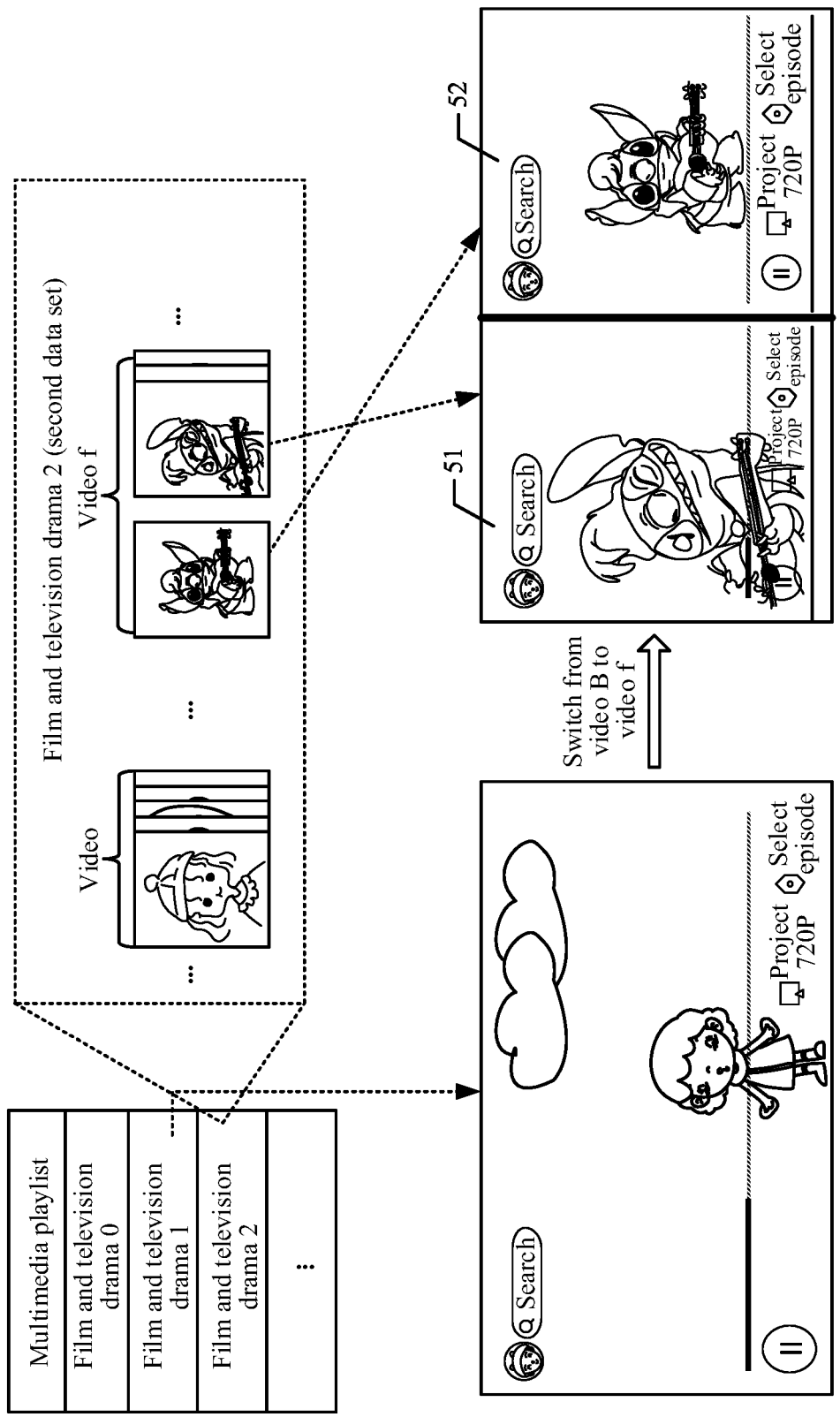
FIG. 5A is a schematic diagram of playing a target video according to some embodiments.

As can be seen from the above, when the second multimedia data is the target video, the multimedia frame corresponding to the target starting point in the target video is the target image frame. If the target image frame is an image frame in the target video other than the head image frame, but the target user may intend to play the target video starting from the head image frame, the target terminal may simultaneously display the target image frame and the head image frame for the target user by various methods, thereby enriching multimedia playback logics and improving the user stickiness. Refer to the following description:

In an implementation, the target image frame and the head image frame may be simultaneously displayed for the target user by split-screen displaying. The terminal screen may be split into a first screen region and a second screen region in response to the media switching operation. The target video is played in the first screen region starting from the target image frame. The target video is played in the second screen region starting from the head image frame. Assuming that the target video is the video f shown in FIG. 3D above, a schematic diagram of playing the target video in a first screen region 51 based on the target image frame and playing the target video in a second screen region 52 based on the head image frame by the target terminal may be as shown in FIG. 5A. It is to be understood that the left-right screen splitting in FIG. 5A is described by way of example only, and the specific screen splitting manner is not limited thereto. For example, in some other embodiments, the terminal screen may be split into a first screen region and a second screen region by vertical screen splitting. For another example, in FIG. 5A, the terminal screen is equally split into a first screen region and a second screen region by left-right screen splitting. However, in some other embodiments, the areas of the first screen region and the second screen region obtained by the left-right screen splitting may also be different.

Figure 5B:
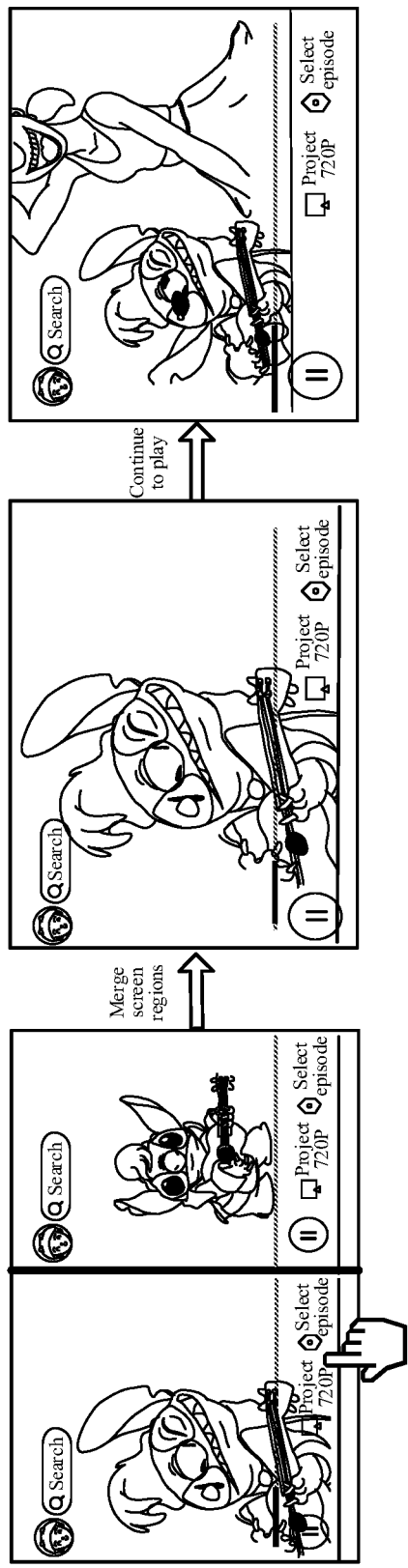
FIG. 5B is a schematic diagram of playing a target video according to some embodiments.

After the target video is played respectively based on the target image frame and the head image frame by split-screen displaying, the target terminal may support the target user in selecting one of the screen regions to realize screen merging, and continuing to play the target video in the merged terminal screen according to the playback logic corresponding to the selected screen region. Taking the first screen region as an example, the first screen region and the second screen region are merged in response to a selection operation performed on the first screen region; and the target video continues to be played on the merged terminal screen starting from a reference image frame. The reference image frame is an image frame displayed in the first screen region at a moment at which the selection operation is performed. For example, when the selection operation is detected, an image frame at the 38th second is being displayed in the first screen region. In this case, the reference image frame is the image frame at the 38th second, and the target terminal may continue to play the image frames image frames after the 38th second in the merged terminal screen, as shown in FIG. 5B.

In some embodiments, the target image frame and the head image frame may be simultaneously displayed for the target user through a video sub-page. In response to the media switching operation, a video playback interface is outputted on the terminal screen and the target video is played in the video playback interface by using the head image frame as a playback starting point. A video sub-page 53 is outputted on the video playback interface, and the target image frame is displayed in the video sub-page 53, or the target video is displayed in the video sub-page by using the target image frame as a playback starting point. The video sub-page is an interface independent of the video playback interface, that is, the video sub-page may be understood as a sub-window (or called a floating window) suspended on the video playback interface. Still assuming that the target video is the video f shown in FIG. 3D above, a schematic diagram of playing the target video in the video playback interface based on the head image frame and displaying or playing the target image frame in the video sub-page by the target terminal may be as shown in FIG. 5C.

After displaying or playing the target image frame in the video sub-page, the target terminal may further support the target user in performing a triggering operation (such as a click operation, a press operation, a mid-air gesture operation, etc.) on the video sub-page to trigger the target terminal to continue to play the target video in full screen according to the playback logic of the video sub-page. Processing resources can be saved by fixedly displaying the target image frame in the video sub-page. By starting to play the target video in the video sub-page based on the target image frame, more image frames can be displayed for the target user through the video sub-page, so as to output more video information to the target user, thereby attracting the target user to trigger the video sub-page.

Correspondingly, in a case that the video sub-page is triggered, switching from a first current image frame to a second current image frame in the video playback interface is performed, and image frames located after the second current image frame in the target video continue to be displayed. The first current image frame is an image frame displayed in the video playback interface at a moment at which the video sub-page is triggered. The second current image frame is an image frame displayed in the video sub-page at the moment at which the video sub-page is triggered. It is to be understood that, if the target image frame is always fixedly displayed in the video sub-page before the video sub-page is triggered, the second current image frame is the target image frame. If the target video is played in the video sub-page starting from the target image frame before the video sub-page is triggered, i.e., the image frame in the video sub-page is changing, the second current image frame may be the target image frame (the video sub-page triggered when the target image frame is displayed), or an image frame after the target image frame (the video sub-page triggered after the target image frame is played).

Figure 5C:
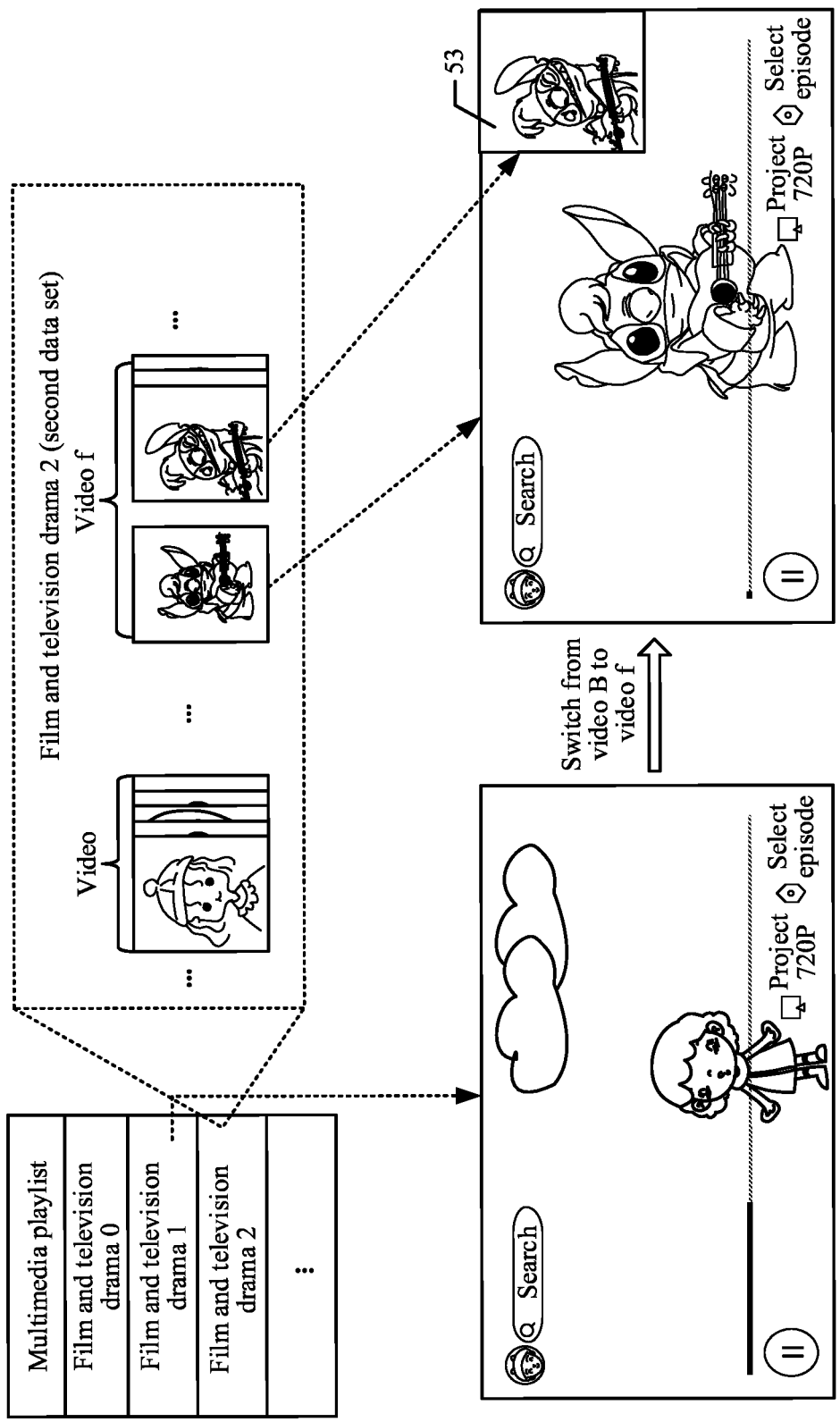
FIG. 5C is a schematic diagram of playing a target video according to some embodiments.
Figure 5D:
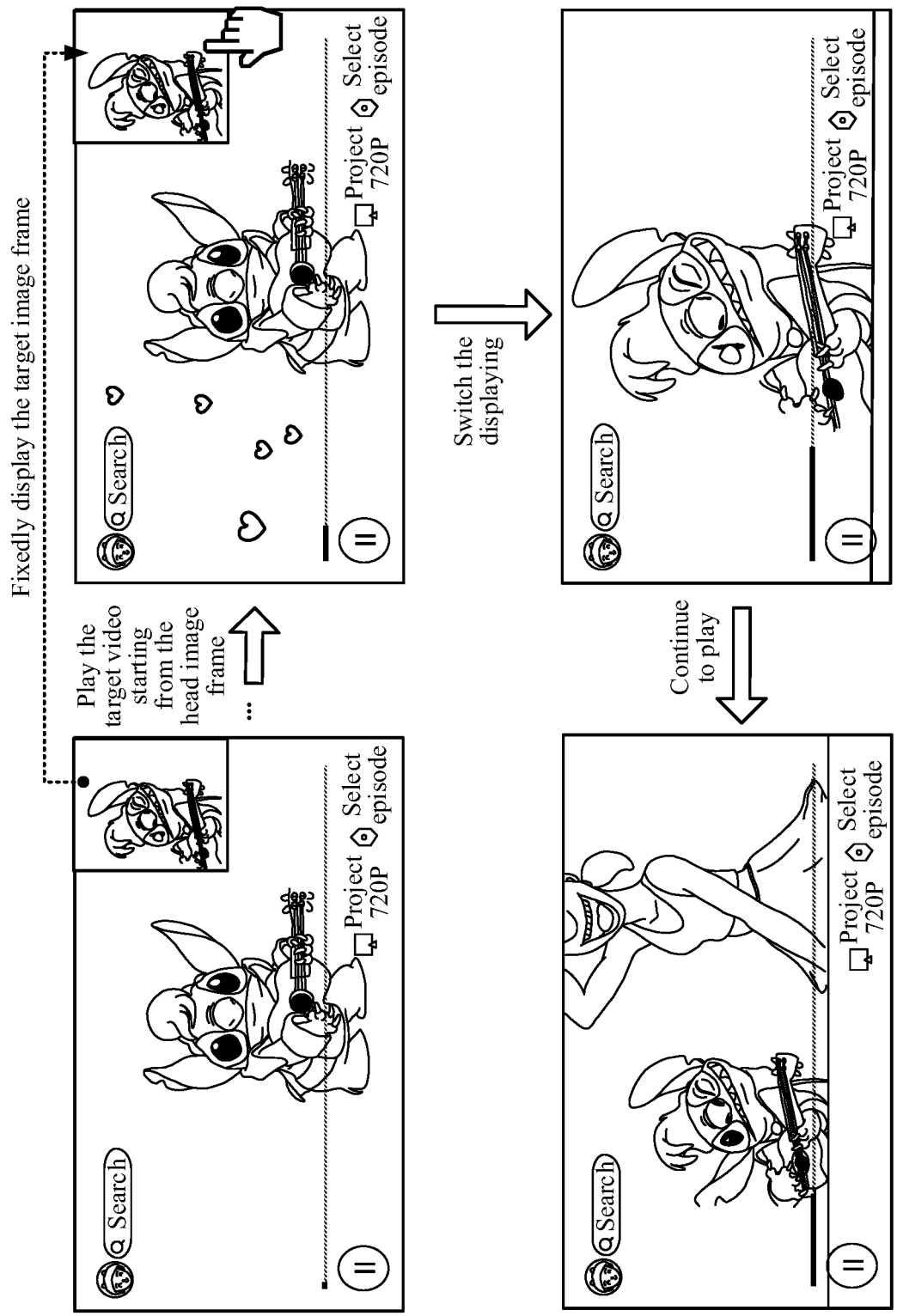
FIG. 5D is a schematic diagram of playing a target video according to some embodiments.
Figure 5E:
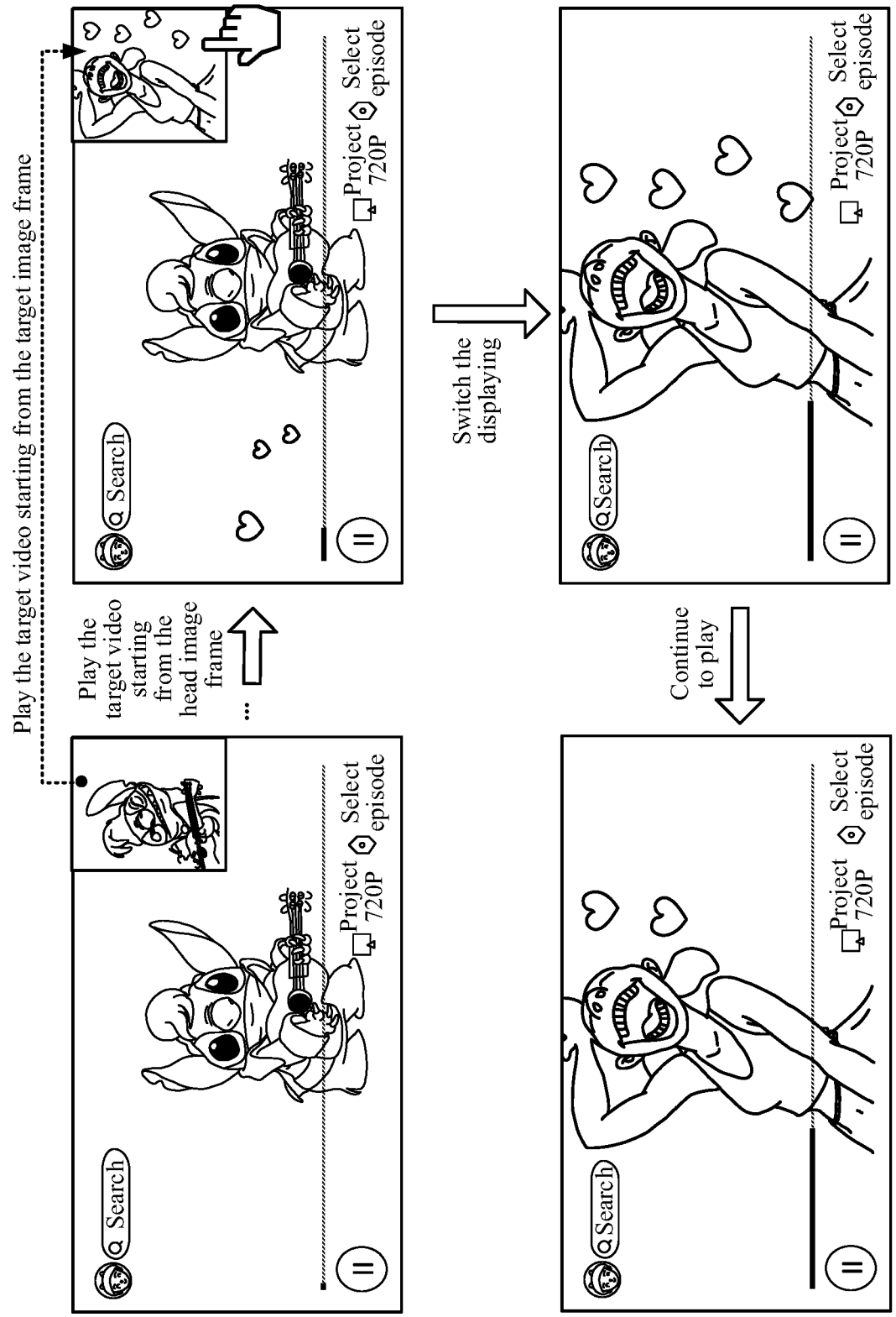
FIG. 5E is a schematic diagram of playing a target video according to some embodiments.

For example, in the example shown in FIG. 5C, the target video is the video f shown in FIG. 3D above, and the target starting point is the 36th second in the video f. For the case where the target image frame is always fixedly displayed in the video sub-page: after the video sub-page is outputted, the image frame at the 36th second may be always fixedly displayed in the video sub-page; if the image frame at the 15th second is being displayed in the video playback interface when the video sub-page is triggered, the first current image frame is the image frame at the 15th second, and the second current image frame is still the image frame at the 36th second. Therefore, the target terminal may switch from playing the image frame at the 15th second to playing the image frame at the 36th second in the video playback interface, and continue to play the image frames after the 36th second, as shown in FIG. 5D. In the case where the target video is played in the video sub-page starting from the target image frame, after the video sub-page is outputted, the target video may be played in the video sub-page starting from the 36th second. If the image frame at the 15th second is being displayed in the video playback interface when the video sub-page is triggered, the first current image frame is the image frame at the 15th second, and the video sub-page is displaying an image frame at the 51st second, that is, the second current image frame is the image frame at the 51st second. Therefore, the target terminal may switch from playing the image frame at the 15th second to playing the image frame at the 51st second in the video playback interface, and continue to play the image frames after the 51st second, as shown in FIG. 5E.

In some other embodiments, because the second current image frame has been displayed in the video sub-page, Therefore, when the video sub-page is triggered, switching from displaying the first current image frame to displaying a next image frame of the second current image frame may be performed in the video playback interface, and the image frames in the target video after the next image frame continue to be displayed. That is to say, in some other embodiments, the target terminal may also support continuing to play the target video following the second current image frame after the video sub-page is triggered, rather than displaying the second current image frame in full screen.

S403. Display a playback progress axis of the second multimedia data on a terminal screen, the playback progress axis including playback progress positions corresponding to time points.

S404. Display a progress marker element at a target playback progress position on the playback progress axis.

Figure 5F:
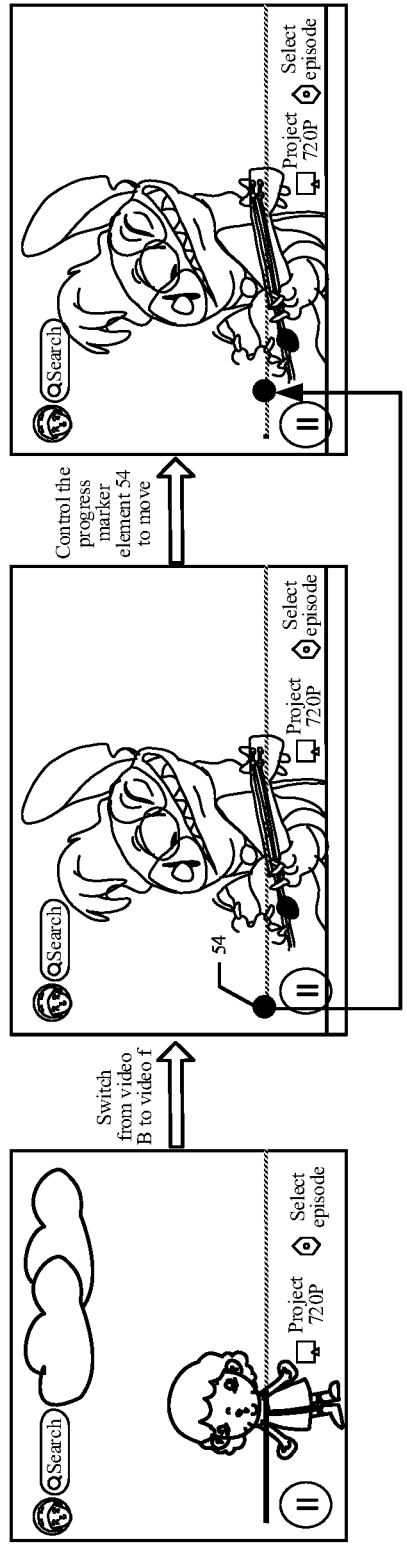
FIG. 5F is a schematic diagram of displaying a progress prompt element according to some embodiments.

The target playback progress position is the playback progress position corresponding to the target starting point on the playback progress axis. In an implementation, the progress marker element may be displayed at the target playback progress position while displaying the playback progress axis. That is, the progress marker element is displayed at the target playback progress position while switching from the first multimedia data to the second multimedia data. In some embodiments, the progress marker element may be displayed at a default playback progress position on the playback progress axis, the default playback progress position being the playback progress position corresponding to a first time point on the playback progress axis; and then, the progress marker element may be controlled to move from the default playback progress position to the target playback progress position on the playback progress axis, to display the progress marker element at the target playback progress position. By displaying the progress marker element in this implementation, a jump animation of the progress marker element may be realized, making the process more interesting. The jump animation may last for 0.2 seconds, 0.1 seconds, etc. The specific form of the progress marker element may be set to, for example, a small dot, a triangle, a five-pointed star, etc., according to a service requirement. For example, the form of the progress marker element 54 is a small dot, and a schematic diagram of controlling the progress marker element 54 to move from the default playback progress position to the target playback progress position on the playback progress axis is as shown in FIG. 5F.

In an implementation, the target terminal may read a preset playback duration of the second multimedia data, and after determining the preset playback duration, may associate the preset playback duration with the playback progress axis to determine a correspondence between displacement distances of the progress mark element on the playback progress axis and time points. After the target starting point is determined, the target playback progress position may be determined according to the correspondence and the target starting point, so that after the playback progress axis is displayed, the progress marker element is displayed at the target playback progress position. After the progress marker element is displayed at the target playback progress position, the progress marker element may automatically move with the playback progress of the second multimedia data until the playing of the second multimedia data is complete.

① The execution order of S403-S404 and S402 is not limited thereto. For example, S403-S404 may be performed after S402, may be performed before S402, or may be performed concurrently with S402, which is not limited herein. ② If the first multimedia data and the second multimedia data are videos in a video playback application, the target terminal may play the first multimedia data and the second multimedia data in landscape mode to expand the display range of each image frame in the first multimedia data and the second multimedia data. Moreover, in addition to the first multimedia data and the second multimedia data, other videos in the video playback application may all be played in landscape mode. That is to say, any video triggered to be played in the video playback application is played in landscape mode. The playback principle of the video playback application in this case is roughly as follows:

When the target user opens the video playback application, the video playback application is displayed in a horizontal full-screen video playback mode (that is, the landscape mode) by default without requiring manual switching. To play a certain video for the target user, a starting point of the video may be set according to the user preference profile of the target user, and the video is played based on the starting point. The target user may switch the video set (that is, the data set) through the second interaction operation of sliding in the vertical direction (that is, the up-down direction) on the terminal screen in the horizontal full-screen mode. If the user watching a video A in a video set is willing to continue watching, the user may continue watching the video A, or may input the first interaction operation to switch to other videos in the video set. Each time video switching is performed, the user preference profile of the target user may be updated. For example, if a relevant preference tag such as "Actor A" and "Spy War" is obtained according to a multimedia playback history of the target user, a next video is found according to the preference tag and switched to, and according to the preference label "Actor A" in the user preference profile, a starting point of the next video may be adjusted to a time point corresponding to an image frame containing an important plot of the actor A.

S405. Switch, during the playing of the second multimedia data, from playing a first multimedia frame in the second multimedia data to playing a multimedia frame corresponding to a new starting point, in response to a target triggering operation.

For the implementation of S405, reference may be made to the related description of S203 in the foregoing method embodiments, and the details will not be repeated herein.

In some embodiments, in response to the media switching operation during playing of the first multimedia data, the second multimedia data may be played starting from the target starting point of the second multimedia data. Since the target starting point is determined according to at least one of the user preference profile of the target user and the hot spot information, the multimedia frame corresponding to the target starting point can satisfy interest preferences of the target user to a greater extent. Therefore, playing the second multimedia data starting from the target starting point can greatly improve the attraction of the second multimedia data to the target user, making the target user more willing to continue playing the second multimedia data, thereby improving the user stickiness of the second multimedia data. In addition, in response to a target triggering operation during playing of the second multimedia data, switching from a first multimedia frame to a multimedia frame that can satisfy an interest preference of the target user (that is, a multimedia frame corresponding to a new starting point) may be automatically performed by positioning and switching the playback point, thereby improving the attraction of the second multimedia data to the target user and improving the user stickiness. Moreover, because the target user does not need to repeatedly drag the progress bar to find the next multimedia frame that the target user is interested in, the convenience can be effectively improved. Since the whole process does not require the target user to manually find and play data that can arouse the interest of the target user, not only the playback efficiency of multimedia data can be effectively improved, but also the playback of useless multimedia frames that are not of interest to the target user can be reduced, thereby saving processing resources and effectively improving the playback effectiveness of the second multimedia data.

Figure 6A:
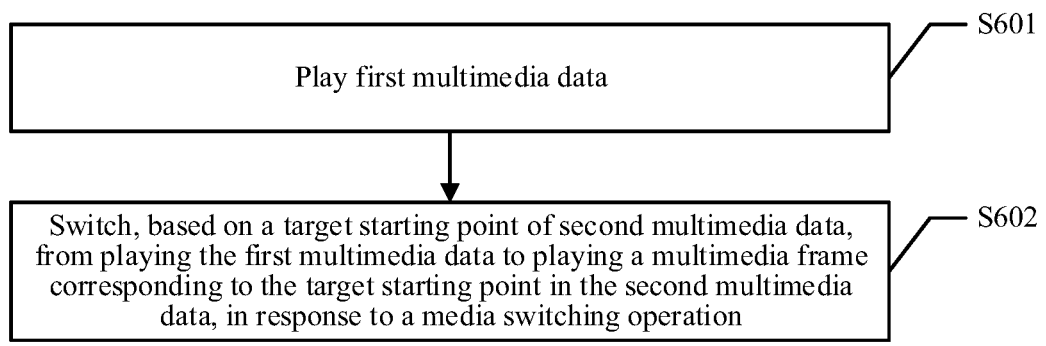
FIG. 6A is a schematic flowchart of a multimedia playback method according to some embodiments.

Based on the related descriptions of the method embodiments shown in FIG. 2 and FIG. 4, some embodiments further provide a multimedia playback method shown in FIG. 6A. The multimedia playback method may be executed by the target terminal mentioned above, or executed jointly by the target terminal and the server. For ease of description, some embodiments are mainly described using an example where the multimedia playback method is executed by the target terminal. As shown in FIG. 6A, the multimedia playback method may include the following operations S601-S602.

S601. Play first multimedia data.

S602. Switch, based on a target starting point of second multimedia data, from playing the first multimedia data to playing a multimedia frame corresponding to the target starting point in the second multimedia data, in response to a media switching operation.

The target starting point is determined according to at least one of following information: a user preference profile of a target user and hot spot information of the second multimedia data. In an implementation, the second multimedia data includes a plurality of starting points, and each of the starting points has tag information. The target terminal may calculate a matching degree between the user preference profile and the label information of each of the starting points to obtain a calculation result. Then, the target terminal determines the starting point corresponding to a maximum matching degree in the calculation result as the target starting point. In some embodiments, the target terminal may select P candidate starting points according to the calculation result, and then select the target starting point from the P candidate starting points. For the specific selection manner, reference may be made to the related description of S402 in the foregoing method embodiments. That is to say, in this implementation, the target starting point is determined according to the user preference profile of the target user.

In some embodiments, the hot spot information of the second multimedia data may be used to indicate a multimedia frame with a large popularity value in the second multimedia data. The target terminal may determine the time point at which the multimedia frame having a maximum popularity value is located as the target starting point according to the hot spot information. In some embodiments, the target terminal may determine a time point at which each multimedia frame indicated by the hot spot information is located as the P candidate starting points, and then select the target starting point from the P candidate starting points. For the specific selection manner, reference may be made to the related description of S402 in the foregoing method embodiments. That is to say, in this implementation, the target starting point is determined based on the hot spot information of the second multimedia data.

In some embodiments, a matching degree between the user preference profile and the tag information of each of the starting points is calculated to obtain a first recommendation score of the starting point. Each of the starting points is scored according to the hot spot information to obtain a second recommendation score of the starting point. Then, a weighted summation is performed on the first recommendation score and the second recommendation score of each starting point respectively, to obtain a target recommendation score of the starting point. Finally, the starting point having a maximum target recommendation score may be selected as the target starting point. In some embodiments, P starting points corresponding to target recommendation scores greater than a score threshold are selected as the P candidate starting points, and then the target starting point is selected from the P candidate starting points. For the specific selection manner, reference may be made to the related description of S402 in the foregoing method embodiments. That is to say, in this implementation, the target starting point is determined according to both the hot spot information of the second multimedia data and the user preference profile of the target user.

① for the specific playback manner used for the first multimedia data and the second multimedia data in S601 and S602 in some embodiments, reference may be made to the related descriptions of S201-S202 and S401-S402 in the above method embodiments, and the details will not be repeated herein. ② It may be known from the related descriptions of the foregoing method embodiments that the first multimedia data mentioned in some embodiments may be played starting from the first starting point, and the second multimedia data may be played starting from the target starting point. Similarly, the target terminal may also play multimedia data other than the first multimedia data and the second multimedia data starting from a certain starting point. That is to say, for any multimedia data, in response to not detecting a media switching operation, the target terminal may also determine a starting point of the any multimedia data according to one or more of the user preference profile of the target user and hot spot information of the any multimedia data, and sequentially and continuously play the any multimedia data starting from the determined starting point.

In some embodiments, in response to the media switching operation during playing of the first multimedia data, switching from playing the first multimedia data to playing the multimedia frame corresponding to the target starting point in the second multimedia data may be performed based on the target starting point of the second multimedia data. Since the target starting point is determined according to at least one of the user preference profile of the target user and the hot spot information of the second multimedia data, the multimedia frame corresponding to the target starting point can satisfy interest preferences of the target user or arouse the interest of the target user to a greater extent. Therefore, playing the second multimedia data starting from the target starting point can greatly improve the attraction of the second multimedia data to the target user, making the target user more willing to continue playing the second multimedia data, thereby improving the user stickiness of the second multimedia data and the playback conversion rate of the second multimedia data. Since the whole process does not require the target user to manually find and play multimedia frames that can arouse the interest of the target user by repeatedly dragging the progress bar, not only the convenience and the playback efficiency of multimedia data can be effectively improved, but also the playback of useless multimedia frames that are not of interest to the target user can be reduced, thereby saving processing resources and effectively improving the playback effectiveness of the second multimedia data.

Figure 6B:
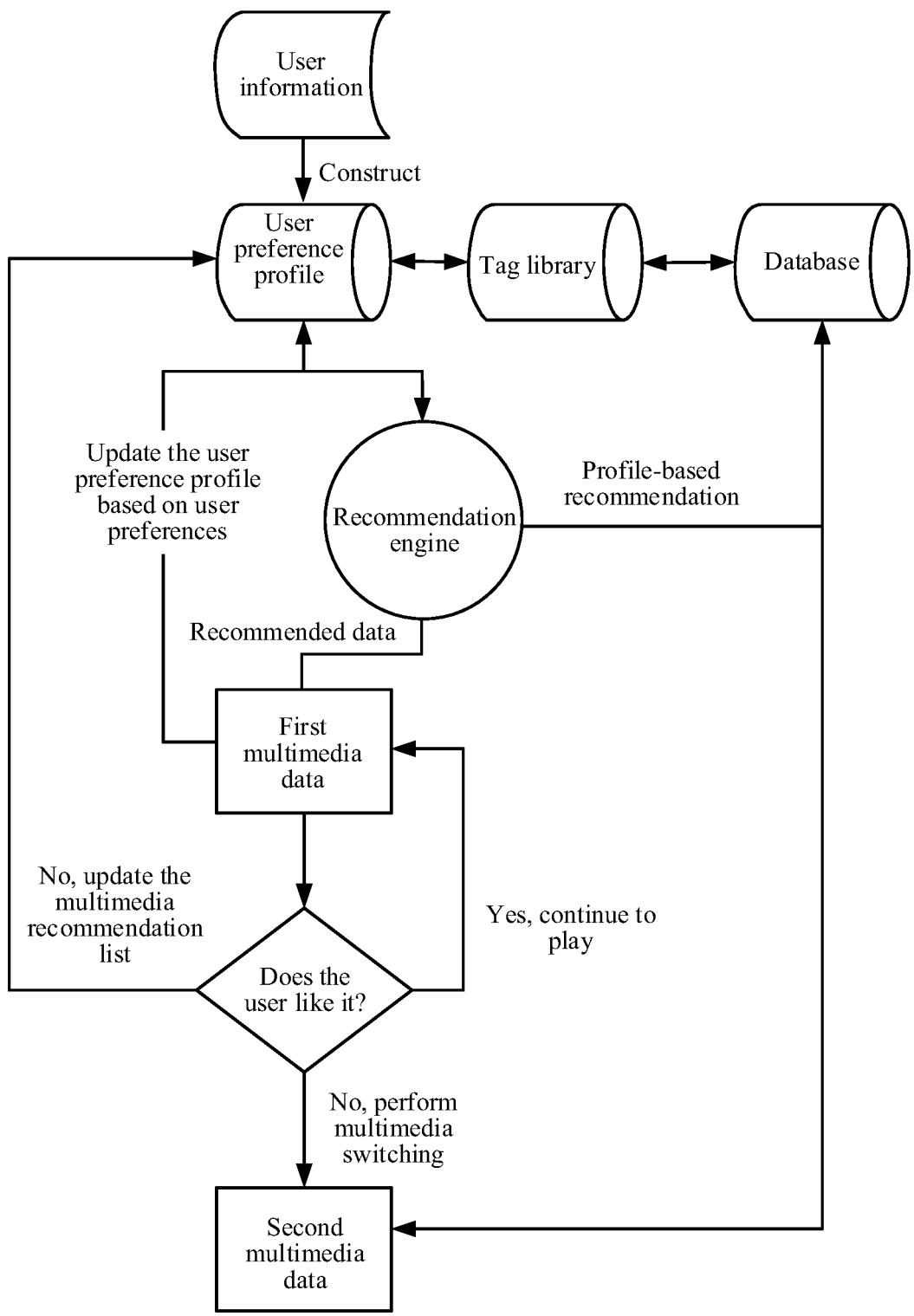
FIG. 6B is a schematic flowchart of a multimedia playback method according to some embodiments.

The multimedia playback methods shown in FIG. 2, FIG. 4, and FIG. 6A are mainly described using the target terminal as the execution entity. Based on the descriptions of the embodiments shown in FIG. 2, FIG. 4, and FIG. 6A, some embodiments further provide a multimedia playback method shown in FIG. 6B. Some embodiments are mainly described using an example where the multimedia playback method is executed jointly by a target terminal and a server. The multimedia playback method may include the following operations.

First, the target terminal may obtain user information of a target user when the target user uses a target application (e.g., a video playback application or a music playback application) for the first time. The user information is, for example, social information obtained through a social account (e.g., OpenID), terminal information (such as a terminal manufacturer, model (device layer), etc.) of the target terminal obtained after active authorization by the target user, surrounding environment information (e.g., a current location, resident location, etc. of the target user), behavior trajectory information obtained after authorization by the target user, a user relationship obtained through a shared network (e.g., a network hotspot, Wireless Fidelity (WIFI)) and from a user address book, application information of installed applications determined through application installation records, and so on. Then, a preference of the target user may be predicted according to the user information, so as to obtain an initial user preference profile. Different user information may correspond to different prediction methods. For example, for the surrounding environment information, the target terminal may determine other users who belong to the same area as the target user through big data analysis according to the current location or resident location of the target user, and add preference tags of the other users to the initial user preference profile. For another example, for the user relationship through the shared network, associated users who frequently use the same network as the target user may be determined according to the user relationship, and preference tags of the other users are added to the initial user preference profile. For another example, for the application information, an installed application may be determined according to the application information, and a preference tag of the target user may be determined according to an application function of the installed application. If the installed application often pushes adventure videos, it may be determined that the preference tag of the target user is "adventurous". If the installed application often pushes news about a star XX, it may be determined that the preference tag of the target user is "star XX".

Then, the target terminal may send the initial user preference profile of the target user to the server. The server determines, according to a mapping relationship between user preference profiles and data tags of the multimedia data, a data tag mapped to the initial user preference profile of the target user, and stores the data identifier (e.g., multimedia A) of the multimedia data indicated by the determined data tag and the initial user preference profile (e.g., user preference profile A) of the target user to Table 1 below:

TABLE 1

| User preference profile A | User preference profile B | User preference profile C | User preference profile . . . |
|---|---|---|---|
| Preference tag x . . . Multimedia A | Preference tag w . . . Multimedia B | Preference tag r . . . Multimedia C | Preference tag p . . . Multimedia . . . |

When the target user has a demand for playing multimedia data, the target terminal may request the server to recommend multimedia data to be played through a recommendation engine based on the user preference profile. For example, the server may deliver multimedia data in Table 1 that corresponds to the multimedia A to the target terminal as first multimedia data. During the playing of the first multimedia data, the recommendation engine of the server may further obtain a relevant preference tag (e.g., a first preference tag) from the user preference profile of the target user, search a database for relevant matching multimedia data according to the relevant preference tag, and after determining the matching multimedia data, search for matching starting points in each matching multimedia data according to a second preference tag in the user preference profile. If the recommendation engine finds data matching the user preference profile through the two search operations, the recommendation engine calculates weights of all contents having matching items, determines candidate multimedia data according to the weight calculation result, and send candidate data sets to which the candidate multimedia data respectively belongs to the target terminal. After receiving the candidate data sets, the target terminal may add the candidate data sets to a multimedia playlist, and automatically preload candidate multimedia data in neighboring multimedia data sets and multimedia frames corresponding to the matching starting points according to the arrangement position of the first multimedia data in the multimedia playlist.

During the playing of the first multimedia data, a preference measurement value of the target user with respect to the first multimedia data may be obtained, and the user preference profile may be updated according to the preference measurement value. In addition, it may further be detected whether the target user likes the first multimedia data. If the target user likes the first multimedia data, the target terminal continues playing the first multimedia data. If the target user does not like the first multimedia data, the target terminal may perform multimedia data switching and an operation of updating the multimedia recommendation list. In addition, the target user may also implement multimedia switching by inputting a media switching operation (e.g., an operation of inputting a first gesture or a second gesture). When the target user performs multimedia switching by inputting the first gesture or the second gesture, the target terminal may immediately obtain second multimedia data from the pre-loaded data set according to the specific interaction operation, and play a multimedia frame corresponding to a target starting point in the preloaded second multimedia data. If the target terminal has only one player and receives only one video player controller, the target terminal may bind a buffer address of the second multimedia data to be played by the video player controller, so as to realize the switching to playing of the second multimedia data. Similar to the first multimedia data, after the target user plays the second multimedia data, the target terminal may perform interest classification according to the degree of preference of the target user for the second multimedia data, and map interest data after the classification to a preset preference tag. Then, the target terminal may send the successfully mapped-to preference label to the server, so that the server updates the preference label to the user preference profile. It may be understood that, a larger number of pieces of multimedia data played by the target user indicates richer preference tags of the user preference profile of the target user and a more accurate recommendation result.

It can be seen that the decision-making costs of the target user can be reduced by helping the target user to adjust the starting point according to the user preference profile while playing multimedia data, especially multimedia data of a long preset playback duration, so as to play the multimedia data. Moreover, the costs of previewing multimedia data can be effectively reduced by simple gestures such as sliding up and down or sliding left and right and instant playback, thereby improving the user stickiness.

Figure 7:
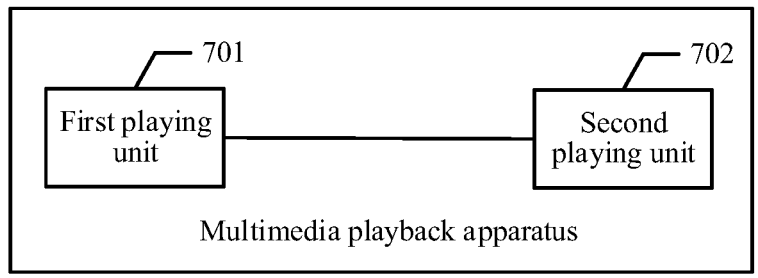
FIG. 7 is a schematic structural diagram of a multimedia playback apparatus according to some embodiments.

Based on the descriptions of the related embodiments of the multimedia playback methods shown in FIG. 2 and FIG. 4, some embodiments further provide a multimedia playback apparatus. The multimedia playback apparatus may be a computer program (including a program code) running in a target terminal. The multimedia playback apparatus may execute the multimedia playback method shown in FIG. 2 or FIG. 4. Referring to FIG. 7, the multimedia playback apparatus may run the following units:

a first playing unit 701, configured to play first multimedia data; and a second playing unit 702, configured to switch, based on a target starting point of second multimedia data, from playing the first multimedia data to playing a multimedia frame corresponding to the target starting point in the second multimedia data, in response to a media switching operation, the second multimedia data including multimedia frames corresponding to a plurality of time points, the plurality of time points including pre-configured P candidate starting points, the target starting point belonging to the P candidate starting points, and P being a positive integer greater than 1; and the second playing unit 702 being further configured to switch, during the playing of the second multimedia data, from playing a first multimedia frame in the second multimedia data to playing a multimedia frame corresponding to a new starting point, in response to a target triggering operation, the first multimedia frame being a multimedia frame played at a moment at which the target triggering operation is performed, and the new starting point being a candidate starting point other than the target starting point among the P candidate starting points.

In an implementation, the first multimedia data belongs to a first data set;

in a case that the media switching operation includes a first interaction operation for instructing to perform multimedia switching in a same data set, the second multimedia data is multimedia data in the first data set other than the first multimedia data; and in a case that the media switching operation includes a second interaction operation for instructing to perform multimedia switching in different data sets, the second multimedia data is multimedia data in a second data set, and the second multimedia data is determined according to one or more of a user preference profile of a target user and hot spot information of the second multimedia data.

In some embodiments, any of the first interaction operation and the second interaction operation is inputted in any of following manners: a gesture, voice, triggering a switching element on a terminal screen, and triggering a terminal physical key, where the switching element includes a switching component or a blank area in the terminal screen; and the switching component is displayed on the terminal screen during the playing of the first multimedia data.

In some embodiments, when starting to play the second multimedia data based on the target starting point of the second multimedia data in response to the media switching operation, the second playing unit 702 may be further configured to execute operations of:

playing a target multimedia frame corresponding to the target starting point in response to the media switching operation, the target multimedia frame being a multimedia frame corresponding to the target starting point in the second multimedia data; and after the playing of the target multimedia frame is finished, continuing to play a remaining multimedia frame located after the target multimedia frame in the second multimedia data.

In some embodiments, in a case that the target triggering operation includes a first progress adjustment operation, the new starting point is a candidate starting point later than a first time point corresponding to the first multimedia frame and closest to the first time point among the P candidate starting points;

in a case that the target triggering operation includes a second progress adjustment operation, the new starting point is a candidate starting point earlier than the target starting point and closest to the target starting point among the P candidate starting points; and in a case that the target triggering operation includes a custom selection operation for the P candidate starting points, the new starting point is a candidate starting point determined among the P candidate starting points according to the custom selection operation.

In some embodiments, the second playing unit 702 may be further configured to execute operations of:

after the playing of the multimedia frame corresponding to the new starting point is finished, continuing to play multimedia frames corresponding to time points after the new starting point in the second multimedia data.

In some embodiments, the target starting point is a time point other than a first time point among the plurality of time points; and correspondingly, the second playing unit 702 may be further configured to execute operations of:

switching, during the playing of the second multimedia data, from playing a second multimedia frame to playing a multimedia frame corresponding to the first time point, in response to a head frame playback triggering operation, the second multimedia frame being a multimedia frame played at a moment at which the head frame playback triggering operation is performed; and after the playing of the multimedia frame corresponding to the first time point is finished, continuing to play multimedia frames corresponding to time points after the first time point in the second multimedia data.

In some embodiments, the second playing unit 702 may be further configured to execute operations of:

displaying a playback progress axis of the second multimedia data on a terminal screen, the playback progress axis including playback progress positions corresponding to time points; and displaying a progress marker element at a target playback progress position on the playback progress axis, the target playback progress position being the playback progress position corresponding to the target starting point on the playback progress axis.

In some embodiments, when displaying the progress marker element at the target playback progress position on the playback progress axis, the second playing unit 702 may be further configured to execute operations of:

displaying the progress marker element at a default playback progress position on the playback progress axis, the default playback progress position being the playback progress position corresponding to a first time point on the playback progress axis; and controlling the progress marker element to move from the default playback progress position to the target playback progress position on the playback progress axis, to display the progress marker element at the target playback progress position.

In some embodiments, the second multimedia data is a target video, a multimedia frame corresponding to the target starting point in the target video is a target image frame, and the target image frame is an image frame in the target video other than a head image frame; and correspondingly, when starting to play the second multimedia data based on the target starting point of the second multimedia data in response to the media switching operation, the second playing unit 702 may be further configured to execute operations of:

splitting a terminal screen into a first screen region and a second screen region in response to the media switching operation;

playing the target video in the first screen region starting from the target image frame; and playing the target video in the second screen region starting from the head image frame.

In some embodiments, the second playing unit 702 may be further configured to execute operations of:

merging the first screen region and the second screen region in response to a selection operation performed on the first screen region; and continuing to play the target video on the merged terminal screen, starting from a reference image frame, the reference image frame being an image frame displayed in the first screen region at a moment at which the selection operation is performed.

In some embodiments, the second multimedia data is a target video, a multimedia frame corresponding to the target starting point in the target video is a target image frame, and the target image frame is an image frame in the target video other than a head image frame; and correspondingly, when starting to play the second multimedia data based on the target starting point of the second multimedia data in response to the media switching operation, the second playing unit 702 may be further configured to execute operations of:

outputting a video playback interface on a terminal screen and playing the target video in the video playback interface by using the head image frame as a playback starting point, in response to the media switching operation;

outputting a video sub-page on the video playback interface, and displaying the target image frame in the video sub-page, or playing the target video in the video sub-page by using the target image frame as a playback starting point, the video sub-page being an interface independent of the video playback interface; and switching from a first current image frame to a second current image frame in the video playback interface and continuing to display image frames located after the second current image frame in the target video, in a case that the video sub-page is triggered, the first current image frame being an image frame displayed in the video playback interface at a moment at which the video sub-page is triggered, and the second current image frame being an image frame displayed in the video sub-page at the moment at which the video sub-page is triggered.

In some embodiments, the first multimedia data and the second multimedia data are a video in a video playback application; and any video triggered to be played in the video playback application is played in a landscape mode.

In some embodiments, the user preference profile includes a first preference tag for multimedia matching and a second preference tag for starting point matching; and correspondingly, the second playing unit 702 may be further configured to execute operations of:

searching a database for matching multimedia data according to the first preference tag in the user preference profile during the playing of the first multimedia data, the matching multimedia data being multimedia data corresponding to a data tag matching with the first preference tag, the matching multimedia data including one or more starting points;

obtaining a tag information set of the matching multimedia data, the tag information set including tag information of the one or more starting points in the matching multimedia data;

searching the tag information set for matching tag information matching with the second preference tag.

determining the matching multimedia data to which the starting point corresponding to the matching tag information belongs as candidate multimedia data, and adding a data set to which the candidate multimedia data belongs as a candidate data set to a multimedia recommendation list, so that a second data set is selected from the multimedia recommendation list in response to the second interaction operation.

In some embodiments, the second playing unit 702 may be further configured to execute operations of:

obtaining a preference measurement value of the target user with respect to the first multimedia data after the multimedia recommendation list is determined, the preference measurement value being used for indicating a degree of preference of the target user for the first multimedia data;

updating the user preference profile of the target user according to the preference measurement value and a data tag of the first data set to which the first multimedia data belongs; and updating all or part of the candidate data set in the multimedia recommendation list according to the updated user preference profile.

In some embodiments, the P candidate starting points are pre-configured according to the user preference profile of the target user; and the second multimedia data includes a plurality of starting points, each of the starting points has tag information, and correspondingly, the second playing unit 702 may be further configured to execute operations of:

calculating a matching degree between the user preference profile and the tag information of each of the starting points to obtain a calculation result;

selecting P target matching degrees greater than a matching threshold from the calculation result, or sequentially selecting P target matching degrees from the calculation result in descending order of the matching degrees; and determining the starting point corresponding to each target matching degree among the P target matching degrees as a candidate starting point.

According to some embodiments, the operations in the methods shown in FIG. 2 and FIG. 4 may be executed by the units of the multimedia playback apparatus shown in FIG. 7. For example, S201 shown in FIG. 2 may be executed by the first playing unit 701 shown in FIGS. 7, and S202-S203 may be executed by the first playing unit 701 and the second playing unit 702 shown in FIG. 7. For another example, S401 shown in FIG. 4 may be executed by the first playing unit 701 shown in FIGS. 7, and S402-S405 may be executed by the second playing unit 702 shown in FIG. 7.

According to some embodiments, units in the multimedia playback apparatus shown in FIG. 7 may be separately or wholly combined into one or several other units, or one (or more) of the units herein may further be divided into multiple units of smaller functions. In this way, same operations can be implemented, and implementation of the technical effects of some embodiments is not affected. The foregoing units are divided based on logical functions. In some embodiments, a function of one unit may also be implemented by a plurality of units, or functions of a plurality of units are implemented by one unit. In some embodiments, the multimedia playback apparatus may also include other units. In some embodiments, the functions may also be cooperatively implemented by other units and may be cooperatively implemented by a plurality of units.

According to some embodiments, a computer program (including program code) that can perform the operations in the corresponding method shown in FIG. 2 or FIG. 4 may run on a general computing device, such as a computer, which include processing elements and storage elements such as a central processing unit (CPU), a random access memory (RAM), and a read-only memory (ROM), to construct the multimedia playback apparatus shown in FIG. 7, and implement the multimedia playback method in some embodiments. The computer program may be recorded in, for example, a computer readable recording medium, and may be loaded into the foregoing computing device by using the computer readable recording medium, and run in the computing device.

In some embodiments, P candidate starting points may be flexibly pre-configured for second multimedia data according to actual requirements, so that in response to a media switching operation during playing of first multimedia data, a target starting point may be flexibly selected from the P candidate starting points, and switching from playing the first multimedia data to playing a multimedia frame corresponding to the target starting point in the second multimedia data is performed based on the target starting point in the second multimedia data, so that the flexibility of multimedia playback can be effectively improved. In addition, in response to a target triggering operation during playing of the second multimedia data, switching from a first multimedia frame to another multimedia frame that meets the actual requirements (that is, a multimedia frame corresponding to a new starting point) may be automatically performed by positioning and switching the playback point, thereby reducing the playback of useless multimedia frames (multimedia frames that do not meet the actual requirements). This not only can further improve the flexibility of multimedia playback, but also can effectively save processing resources and effectively improve the playback effectiveness and playback efficiency of the second multimedia data.

Figure 8:
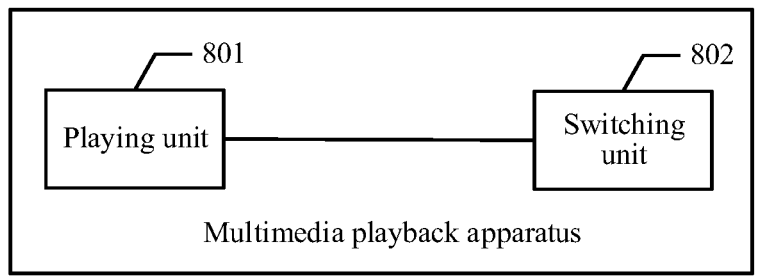
FIG. 8 is a schematic structural diagram of a multimedia playback apparatus according to some embodiments.

Based on the descriptions of the related embodiments of the multimedia playback methods shown in FIG. 6A, some embodiments further provide a multimedia playback apparatus. The multimedia playback apparatus may be a computer program (including a program code) running in a target terminal. The multimedia playback apparatus may execute the multimedia playback method shown in FIG. 6A. Referring to FIG. 8, the multimedia playback apparatus may run the following units:

a playing unit 801, configured to play first multimedia data; and a switching unit 802, configured to switch, based on a target starting point of second multimedia data, from playing the first multimedia data to playing a multimedia frame corresponding to the target starting point in the second multimedia data, in response to a media switching operation, the target starting point being determined according to at least one of following information: a user preference profile of a target user and hot spot information of the second multimedia data.

According to some embodiments, units in the multimedia playback apparatus shown in FIG. 8 may be separately or wholly combined into one or several other units, or one (or more) of the units herein may further be divided into multiple units of smaller functions. In this way, same operations can be implemented, and implementation of the technical effects of some embodiments is not affected. The foregoing units are divided based on logical functions. In some embodiments, a function of one unit may also be implemented by a plurality of units, or functions of a plurality of units are implemented by one unit. In some embodiments, the multimedia playback apparatus may also include other units. In some embodiments, the functions may also be cooperatively implemented by other units and may be cooperatively implemented by a plurality of units.

According to some embodiments, a computer program (including program code) that can perform the operations in the corresponding method shown in FIG. 6A may run on a general computing device, such as a computer, which include processing elements and storage elements such as a central processing unit (CPU), a random access memory (RAM), and a read-only memory (ROM), to construct the multimedia playback apparatus shown in FIG. 8, and implement the multimedia playback method in some embodiments. The computer program may be recorded in, for example, a computer readable recording medium, and may be loaded into the foregoing computing device by using the computer readable recording medium, and run in the computing device.

In some embodiments, in response to the media switching operation during playing of the first multimedia data, switching from playing the first multimedia data to playing the multimedia frame corresponding to the target starting point in the second multimedia data may be performed based on the target starting point of the second multimedia data. Since the target starting point is determined according to at least one of the user preference profile of the target user and the hot spot information of the second multimedia data, the multimedia frame corresponding to the target starting point can satisfy interest preferences of the target user or arouse the interest of the target user to a greater extent. Therefore, playing the second multimedia data starting from the target starting point can greatly improve the attraction of the second multimedia data to the target user, making the target user more willing to continue playing the second multimedia data, thereby improving the user stickiness of the second multimedia data and the playback conversion rate of the second multimedia data. Since the whole process does not require the target user to manually find and play multimedia frames that can arouse the interest of the target user by repeatedly dragging the progress bar, not only the convenience and the playback efficiency of multimedia data can be effectively improved, but also the playback of useless multimedia frames that are not of interest to the target user can be reduced, thereby saving processing resources and effectively improving the playback effectiveness of the second multimedia data.

Figure 9:
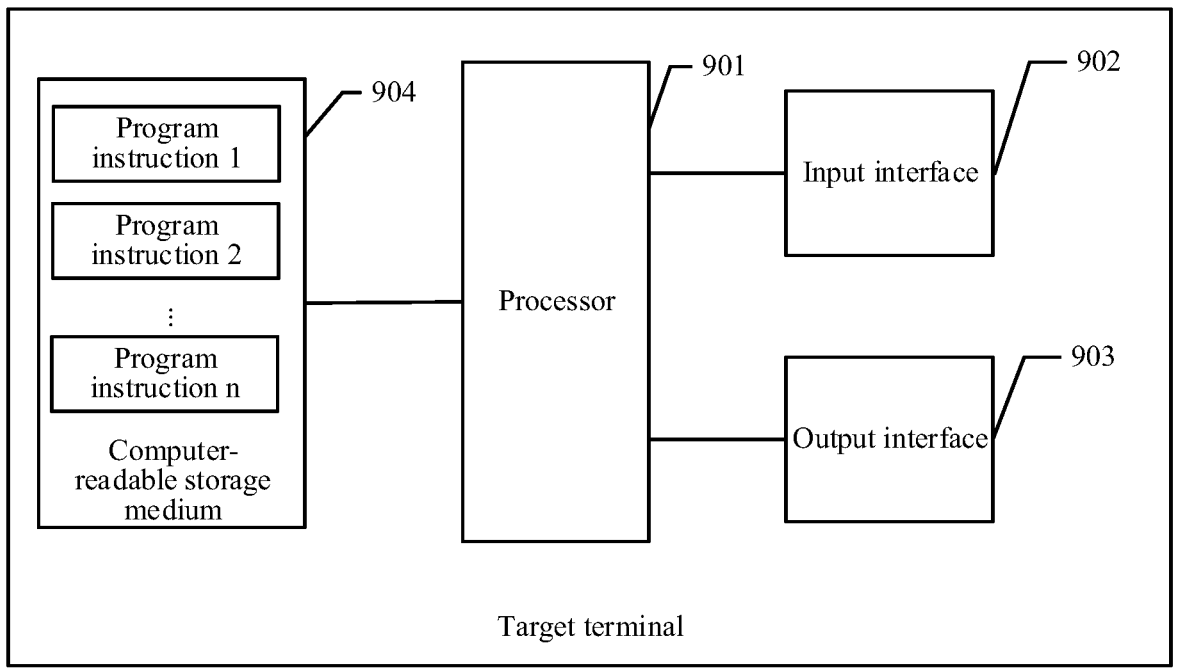
FIG. 9 is a schematic structural diagram of a terminal according to some embodiments.

Based on the descriptions of the foregoing method embodiments and apparatus embodiments, some embodiments further provide a target terminal (terminal for short). Referring to FIG. 9, the terminal at least includes a processor 901, an input interface 902, an output interface 903, and a computer storage medium 904. The processor 901, the input interface 902, the output interface 903, and the computer storage medium 904 in the terminal may be connected by a bus or in another manner.

The computer storage medium 904 may be stored in a memory of the terminal. The computer storage medium 904 is configured to store a computer program. The computer program includes program instructions. The processor 901 is configured to execute the program instructions stored in the computer storage medium 904. The processor 901 (or referred to as a central processing unit, CPU) is a computing core and control core of the terminal, which is adapted to implement one or more instructions, and specifically, adapted to load and execute one or more instructions to implement corresponding method processes or corresponding functions. In another embodiment, the processor 901 described in some embodiments may be configured to perform a series of multimedia playback processing, including: playing first multimedia data; switching, based on a target starting point of second multimedia data, from playing the first multimedia data to playing a multimedia frame corresponding to the target starting point in the second multimedia data, in response to a media switching operation, the second multimedia data including multimedia frames corresponding to a plurality of time points, the plurality of time points including pre-configured P candidate starting points, the target starting point belonging to the P candidate starting points, and P being a positive integer greater than 1; and switching, during the playing of the second multimedia data, from playing a first multimedia frame in the second multimedia data to playing a multimedia frame corresponding to a new starting point, in response to a target triggering operation, the first multimedia frame being a multimedia frame played at a moment at which the target triggering operation is performed, and the new starting point being a candidate starting point other than the target starting point among the P candidate starting points. In another embodiment, the processor 901 described in some embodiments may be configured to perform a series of multimedia playback processing, including: playing first multimedia data; switching, based on a target starting point of second multimedia data, from playing the first multimedia data to playing a multimedia frame corresponding to the target starting point in the second multimedia data, in response to a media switching operation, the target starting point being determined according to at least one of following information: a user preference profile of a target user and hot spot information of the second multimedia data.

Some embodiments may further provide a non-transitory computer storage medium. The computer storage medium is a memory device in a terminal and is configured to store programs and data. As can be understood, the computer storage medium herein may include an internal storage medium of the terminal and may further include an extended storage medium supported by the terminal. The computer storage medium provides storage space, and the storage space stores an operating system of the terminal. In addition, the storage space further stores one more programs instructions suitable for being loaded and executed by the processor 901. The instructions may be one or more computer programs (including program code). The computer storage medium herein may be a high-speed RAM memory, or may be a non-volatile memory, such as at least one magnetic disk storage. In some embodiments, the computer storage medium may be at least one computer storage medium far away from the foregoing processor. In an embodiment, the processor 901 may load and execute one or more instructions stored in the computer storage medium, to implement the method operations in the embodiments of the multimedia playback method shown in FIG. 2, FIG. 4, or FIG. 6.

In some embodiments, P candidate starting points may be flexibly pre-configured for second multimedia data according to actual requirements, so that in response to a media switching operation during playing of first multimedia data, a target starting point may be flexibly selected from the P candidate starting points, and switching from playing the first multimedia data to playing a multimedia frame corresponding to the target starting point in the second multimedia data is performed based on the target starting point in the second multimedia data, so that the flexibility of multimedia playback can be effectively improved. In addition, in response to a target triggering operation during playing of the second multimedia data, switching from a first multimedia frame to another multimedia frame that meets the actual requirements (that is, a multimedia frame corresponding to a new starting point) may be automatically performed by positioning and switching the playback point, thereby reducing the playback of useless multimedia frames (multimedia frames that do not meet the actual requirements). This not only can further improve the flexibility of multimedia playback, but also can effectively save processing resources and effectively improve the playback effectiveness and playback efficiency of the second multimedia data.

According to some embodiments, a computer program product or a computer program may be provided, the computer program product or the computer program including computer instructions, the computer instructions being stored in a computer-readable storage medium. A processor of a computer device reads the computer instructions from the computer-readable storage medium, and executes the computer instructions, so that the computer device performs the methods provided in various embodiments of the foregoing multimedia playback method shown in FIG. 2, FIG. 4, or FIG. 6A.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A multimedia playback method, performed by a computer device, the multimedia playback method comprising:
    playing first multimedia data;
    switching from playing the first multimedia data to playing second multimedia data starting from a multimedia frame corresponding to a target starting point in the second multimedia data based on a media switching operation, the second multimedia data comprising multimedia frames corresponding to a plurality of time points, the plurality of time points comprising pre-configured P candidate starting points, the target starting point belonging to the pre-configured P candidate starting points, and P being a positive integer greater than 1; and
    switching, during the playing of the second multimedia data, from playing a first multimedia frame in the second multimedia data to playing a multimedia frame corresponding to a new starting point based on a target triggering operation, the first multimedia frame being a multimedia frame in the second multimedia data that is being played at a moment at which the target triggering operation is performed, and the new starting point being a candidate starting point other than the target starting point among the pre-configured P candidate starting points, wherein
    the first multimedia data belongs to a first data set;
    when the media switching operation comprises a first interaction operation for instructing to perform multimedia switching in a same data set, the second multimedia data is multimedia data in the first data set other than the first multimedia data; and
    when the media switching operation comprises a second interaction operation for instructing to perform the multimedia switching in different data sets, the second multimedia data is multimedia data in a second data set, and the second multimedia data is determined according to one or more of a user preference profile of a target user and hot spot information of the second multimedia data.

2. The multimedia playback method according to claim 1, wherein any of the first interaction operation and the second interaction operation is inputted in any of following manners:
    a gesture, voice, triggering a switching element on a terminal screen, and triggering a terminal physical key,
    wherein the switching element comprises a switching component or a blank area in the terminal screen; and
    wherein the switching component is displayed on the terminal screen during the playing of the first multimedia data.

3. The multimedia playback method according to claim 1, wherein the switching from playing the first multimedia data to playing the second multimedia starting from the multimedia frame corresponding to the target starting point in the second multimedia data comprises:
    playing a target multimedia frame corresponding to the target starting point based on the media switching operation, the target multimedia frame being a multimedia frame corresponding to the target starting point in the second multimedia data; and
    after the playing of the target multimedia frame is finished, continuing to play a remaining multimedia frame located after the target multimedia frame in the second multimedia data.

4. The multimedia playback method according to claim 1, wherein when the target triggering operation comprises a first progress adjustment operation, the new starting point is a candidate starting point later than a first time point corresponding to the first multimedia frame and closest to the first time point among the pre-configured P candidate starting points;
    when the target triggering operation comprises a second progress adjustment operation, the new starting point is a candidate starting point earlier than the target starting point and closest to the target starting point among the pre-configured P candidate starting points; and
    when the target triggering operation comprises a custom selection operation for the pre-configured P candidate starting points, the new starting point is a candidate starting point determined among the pre-configured P candidate starting points according to the custom selection operation.

5. The multimedia playback method according to claim 4, further comprising:

after the playing of the multimedia frame corresponding to the new starting point is finished, continuing to play multimedia frames corresponding to time points after the new starting point in the second multimedia data.

6. The multimedia playback method according to claim 1, wherein the target starting point is a time point other than a first time point among the plurality of time points; and the multimedia playback method further comprises:
   switching, during the playing of the second multimedia data, from playing a second multimedia frame to playing a multimedia frame corresponding to the first time point, based on a head frame playback triggering operation, the second multimedia frame being a multimedia frame in the second multimedia data that is being played at a moment at which the head frame playback triggering operation is performed; and
   after the playing of the multimedia frame corresponding to the first time point is finished, continuing to play multimedia frames corresponding to time points after the first time point in the second multimedia data.

7. The multimedia playback method according to claim 1, further comprising:
   displaying a playback progress axis of the second multimedia data on a terminal screen, the playback progress axis comprising playback progress positions corresponding to time points; and
   displaying a progress marker element at a target playback progress position on the playback progress axis, the target playback progress position being a playback progress position corresponding to the target starting point on the playback progress axis.

8. The multimedia playback method according to claim 7, wherein the displaying the progress marker element comprises:
   displaying the progress marker element at a default playback progress position on the playback progress axis, the default playback progress position being the playback progress position corresponding to a first time point on the playback progress axis; and
   controlling the progress marker element to move from the default playback progress position to the target playback progress position on the playback progress axis, to display the progress marker element at the target playback progress position.

9. The multimedia playback method according to claim 1, wherein the second multimedia data is a target video, the multimedia frame corresponding to the target starting point in the target video is a target image frame, and the target image frame is an image frame in the target video other than a head image frame; and
   the switching from playing the first multimedia data to playing the second multimedia data starting from the multimedia frame corresponding to the target starting point in the second multimedia data comprises:
   splitting a terminal screen into a first screen region and a second screen region based on the media switching operation;
   playing the target video in the first screen region starting from the target image frame; and
   playing the target video in the second screen region starting from the head image frame.

10. The multimedia playback method according to claim 9, further comprising:
    merging the first screen region and the second screen region based on a selection operation performed on the first screen region; and
    continuing to play the target video on the merged terminal screen, starting from a reference image frame, the reference image frame being an image frame displayed in the first screen region at a moment at which the selection operation is performed.

11. The multimedia playback method according to claim 1, wherein the second multimedia data is a target video, the multimedia frame corresponding to the target starting point in the target video is a target image frame, and the target image frame is an image frame in the target video other than a head image frame; and
    the switching from playing the first multimedia data to playing the second multimedia data starting from the multimedia frame corresponding to the target starting point in the second multimedia data comprises:
    outputting a video playback interface on a terminal screen and playing the target video in the video playback interface by using the head image frame as a playback starting point, based on the media switching operation;
    outputting a video sub-page on the video playback interface, and displaying the target image frame in the video sub-page, or playing the target video in the video sub-page by using the target image frame as the playback starting point, the video sub-page being an interface independent of the video playback interface; and
    switching from a first current image frame to a second current image frame in the video playback interface and continuing to display image frames located after the second current image frame in the target video, in a case that the video sub-page is triggered, the first current image frame being an image frame displayed in the video playback interface at a moment at which the video sub-page is triggered, and the second current image frame being an image frame displayed in the video sub-page at the moment at which the video sub-page is triggered.

12. The multimedia playback method according to claim 1, wherein the first multimedia data and the second multimedia data are a video in a video playback application; and
    the video triggered to be played in the video playback application is played in a landscape mode.

13. The multimedia playback method according to claim 1, wherein the user preference profile comprises a first preference tag for multimedia matching and a second preference tag for starting point matching; and the multimedia playback method further comprises:
    searching a database for matching multimedia data according to the first preference tag in the user preference profile during the playing of the first multimedia data, the matching multimedia data being multimedia data corresponding to a data tag matching with the first preference tag, the matching multimedia data comprising one or more starting points;
    obtaining a tag information set of the matching multimedia data, the tag information set comprising tag information of the one or more starting points in the matching multimedia data;
    searching the tag information set for matching tag information matching with the second preference tag; and
    determining the matching multimedia data to which the starting point corresponding to the matching tag information belongs as candidate multimedia data, and adding the data set to which the candidate multimedia data belongs as a candidate data set to a multimedia recommendation list, so that the second data set is selected from the multimedia recommendation list based on the second interaction operation.

14. The multimedia playback method according to claim 13, further comprising:
obtaining a preference measurement value of the target user with respect to the first multimedia data after the multimedia recommendation list is determined, the preference measurement value being used for indicating a degree of preference of the target user for the first multimedia data;
updating the user preference profile of the target user according to the preference measurement value and the data tag of the first data set to which the first multimedia data belongs; and
updating all or part of the candidate data set in the multimedia recommendation list according to the updated user preference profile.

15. The multimedia playback method according to claim 1, wherein the pre-configured P candidate starting points are pre-configured according to the user preference profile of the target user; and the second multimedia data comprises a plurality of starting points, each of the plurality of starting points has tag information, and the multimedia playback method further comprises:
calculating a matching degree between the user preference profile and the tag information of each of the plurality of starting points to obtain a calculation result;
selecting P target matching degrees greater than a matching threshold from the calculation result, or sequentially selecting P target matching degrees from the calculation result in descending order of the matching degrees; and
determining the starting point corresponding to each target matching degree among the P target matching degrees as the candidate starting point.

16. A multimedia playback apparatus, comprising:
at least one memory configured to store program code; and
at least one processor configured to read the program code and operate as instructed by the program code, the program code comprising:
first playing code configured to cause at least one of the at least one processor to play first multimedia data; and
second playing code configured to cause at least one of the at least one processor:
switch from playing the first multimedia data to playing second multimedia data starting from a multimedia frame corresponding to a target starting point in the second multimedia data, based on a media switching operation, the second multimedia data comprising multimedia frames corresponding to a plurality of time points, the plurality of time points comprising pre-configured P candidate starting points, the target starting point belonging to the pre-configured P candidate starting points, and P being a positive integer greater than 1; and
switch, during the playing of the second multimedia data, from playing a first multimedia frame in the second multimedia data to playing a multimedia frame corresponding to a new starting point, based on a target triggering operation, the first multimedia frame being a multimedia frame in the second multimedia data that is being played at a moment at which the target triggering operation is performed, and the new starting point being a candidate starting point other than the target starting point among the pre-configured P candidate starting points, wherein the first multimedia data belongs to a first data set;
when the media switching operation comprises a first interaction operation for instructing to perform multimedia switching in a same data set, the second multimedia data is multimedia data in the first data set other than the first multimedia data; and
when the media switching operation comprises a second interaction operation for instructing to perform multimedia switching in different data sets, the second multimedia data is multimedia data in a second data set, and the second multimedia data is determined according to one or more of a user preference profile of a target user and hot spot information of the second multimedia data.

17. The multimedia playback apparatus according to claim 16, wherein any of the first interaction operation and the second interaction operation is inputted in any of following manners:
a gesture, voice, triggering a switching element on a terminal screen, and triggering a terminal physical key, wherein the switching element comprises a switching component or a blank area in the terminal screen; and
wherein the switching component is displayed on the terminal screen during the playing of the first multimedia data.

18. A non-transitory computer-readable storage medium, storing computer code that, when executed by at least one processor, causes the at least one processor to at least:
play first multimedia data;
switch from playing the first multimedia data to playing second multimedia data starting from a multimedia frame corresponding to a target starting point of second multimedia data based on a media switching operation, the second multimedia data comprising multimedia frames corresponding to a plurality of time points, the plurality of time points comprising pre-configured P candidate starting points, the target starting point belonging to the pre-configured P candidate starting points, and P being a positive integer greater than 1; and
switch, during the playing of the second multimedia data, from playing a first multimedia frame in the second multimedia data to playing a multimedia frame corresponding to a new starting point based on a target triggering operation, the first multimedia frame being the multimedia frame in the second multimedia data that is being played at a moment at which the target triggering operation is performed, and the new starting point being a candidate starting point other than the target starting point among the pre-configured P candidate starting points, wherein
the first multimedia data belongs to a first data set;
when the media switching operation comprises a first interaction operation for instructing to perform multimedia switching in a same data set, the second multimedia data is multimedia data in the first data set other than the first multimedia data; and
when the media switching operation comprises a second interaction operation for instructing to perform multimedia switching in different data sets, the second multimedia data is multimedia data in a second data set, and the second multimedia data is determined according to one or more of a user preference profile of a target user and hot spot information of the second multimedia data.

* * * * *